United States Patent
Jaffe

(10) Patent No.: US 9,959,429 B2
(45) Date of Patent: May 1, 2018

(54) ASYMMETRICALLY MASKED MULTIPLICATION

(71) Applicant: Cryptography Research, Inc., San Francisco, CA (US)

(72) Inventor: Joshua M. Jaffe, San Francisco, CA (US)

(73) Assignee: CRYPTOGRAPHY RESEARCH, INC., San Francisco, CA (US)

(*) Notice: Subject to any disclaimer, the term of this patent is extended or adjusted under 35 U.S.C. 154(b) by 523 days.

(21) Appl. No.: 13/835,402

(22) Filed: Mar. 15, 2013

(65) Prior Publication Data

US 2014/0281573 A1    Sep. 18, 2014

(51) Int. Cl.
| | |
|---|---|
| G06F 21/00 | (2013.01) |
| G06F 21/72 | (2013.01) |
| G06F 7/72 | (2006.01) |
| H04L 9/00 | (2006.01) |

(52) U.S. Cl.
CPC .............. *G06F 21/72* (2013.01); *G06F 7/723* (2013.01); *H04L 9/003* (2013.01); *G06F 2207/7238* (2013.01); *G06F 2207/7257* (2013.01); *H04L 2209/046* (2013.01)

(58) Field of Classification Search
CPC ... H04L 9/003; H04L 2209/046; G06F 7/723; G06F 2207/7238; G06F 2207/7242; G06F 7/764; G06F 21/72; G06F 2207/7257
USPC .......................................................... 713/189
See application file for complete search history.

(56) References Cited

U.S. PATENT DOCUMENTS

| | | | |
|---|---|---|---|
| 6,295,606 B1* | 9/2001 | Messerges et al. ........... | 713/189 |
| 6,490,357 B1 | 12/2002 | Rose | |
| 6,748,410 B1* | 6/2004 | Gressel et al. ................ | 708/491 |
| 8,265,266 B2* | 9/2012 | Ciet et al. ....................... | 380/28 |
| 2001/0053220 A1* | 12/2001 | Kocher ................. | G06F 21/556 |
| | | | 380/29 |
| 2002/0152252 A1 | 10/2002 | Kaminaga et al. | |
| 2003/0048903 A1* | 3/2003 | Ito et al. ....................... | 380/263 |

(Continued)

FOREIGN PATENT DOCUMENTS

| | | |
|---|---|---|
| EP | 2363975 A1 | 9/2011 |
| FR | 2810178 A1 | 12/2001 |

(Continued)

OTHER PUBLICATIONS

Fouque et al. (2003) "The Doubling Attack—Why Upwards is Better than Downwards" CHES 2003, Lecture Notes in Computer Science, vol. 2779, Eds. C.D. Walter et al. pp. 269-280.

(Continued)

*Primary Examiner* — Mahfuzur Rahman
*Assistant Examiner* — Narciso Victoria
(74) *Attorney, Agent, or Firm* — Finnegan, Henderson, Farabow, Garrett & Dunner, L.L.P.

(57) ABSTRACT

Methods and systems for masking certain cryptographic operations in a manner designed to defeat side-channel attacks are disclosed herein. Squaring operations can be masked to make squaring operations indistinguishable or less distinguishable from multiplication operations. In general, squaring operations are converted into multiplication operations by masking them asymmetrically. Additional methods and systems are disclosed for defeating DPA, cross-correlation, and high-order DPA attacks against modular exponentiation.

25 Claims, 21 Drawing Sheets

(56) References Cited

U.S. PATENT DOCUMENTS

| | | |
|---|---|---|
| 2006/0200514 A1 | 9/2006 | Fischer et al. |
| 2009/0067617 A1 | 3/2009 | Trichina et al. |
| 2009/0086961 A1 | 4/2009 | Sauzet et al. |
| 2009/0092245 A1 | 4/2009 | Fumaroli et al. |
| 2010/0177886 A1 | 7/2010 | Futa et al. |
| 2013/0016828 A1 | 1/2013 | Teglia |

FOREIGN PATENT DOCUMENTS

| | | |
|---|---|---|
| JP | 2009-0537025 | 10/2009 |
| JP | 2010-08883 A | 1/2010 |

OTHER PUBLICATIONS

Walter (2001) "Sliding Windows Succumbs to Big Mac Attack" Proc. CHES, Lecture Notes in Computer Science, vol. 2162, pp. 286-299.

International Search Report and Written Opinion for related International PCT Application No. PCT/US2014/015927, dated Jul. 28, 2014, 9 pages.

EP Extended European Search Report dated Oct. 18, 2016 re: EP Appln. No. 14768235.5. 7 Pages.

EP Response Filed on May 5, 2017 in Response to the Extended European Search Report dated Oct. 18, 2016 and the Communication Pursuant to Rules 70(2) and 70a(2) EPC dated Nov. 7, 2016 re: EP Appln. No. 14768235.5. 16 Pages.

Office Action in Japanese Counterpart, Japanese Patent Application No. 2016-500241, dated Feb. 26, 2018.

* cited by examiner b ^ 1 0 0 1 1 1 0 1 0 1 1 0 1 0 1

$A \leftarrow 1$    $b^0 = 1$

| | | | | |
|---|---|---|---|---|
| $s_i^{+1}$ | Square | $A = A.A$ | $\rightarrow 1*1 = 1$ | 0 |
| | Multiplication | $A = A.b$ | $\rightarrow 1*b = b$ | 1 |
| $s_i^{+2}$ | Square | $A = A.A$ | $\rightarrow b*b = b^2$ | 1 0 |
| $s_i^{+3}$ | Square | $A = A.A$ | $\rightarrow b^2*b^2 = b^4$ | 1 0 0 |
| $s_i^{+4}$ | Square | $A = A.A$ | $\rightarrow b^4*b^4 = b^8$ | 1 0 0 0 |
| | Multiplication | $A = A.b$ | $\rightarrow b^8*b = b^9$ | 1 0 0 1 |
| $s_i^{+5}$ | Square | $A = A.A$ | $\rightarrow b^9*b^9 = b^{18}$ | 1 0 0 1 0 |
| | Multiplication | $A = A.b$ | $\rightarrow b^{18}*b = b^{19}$ | 1 0 0 1 1 |
| $s_i^{+6}$ | Square | $A = A.A$ | $\rightarrow b^{19}*b^{19} = b^{38}$ | 1 0 0 1 1 0 |
| | Multiplication | $A = A.b$ | $\rightarrow b^{38}*b = b^{39}$ | 1 0 0 1 1 1 |

|  | After first update | After second update | After j$^{th}$ update |
|---|---|---|---|
| X | XR | XR$^2$ | XR$^j$ |
| CX | CXR | CXR$^2$ | CXR$^j$ |
| C$^2$X | C$^2$XR | C$^2$XR$^2$ | C$^2$XR$^j$ |
| C$^3$X | C$^3$XR | C$^3$XR$^2$ | C$^3$XR$^j$ |

X → X$^l$ where l < 100

| | | |
|---|---|---|
| XR | X$^2$R | XRC |
| XR$^2$ | X$^2$R$^2$ | . |
| XR$^3$ | X$^2$R$^3$ | . |
| XR$^4$ | X$^2$R$^4$ | . |
| XR$^5$ | X$^2$R$^5$ | . |
| . | . | . |
| . | . | . |
| XR$^{100}$ | X$^2$R$^{100}$ | X$^l$R$^l$C$^l$ |

FIG. 8C

ASYMMETRICALLY MASKED MULTIPLICATION

TECHNICAL FIELD

The embodiments described herein relate generally to systems and methods for performing asymmetrically masked multiplication and, additionally, systems and methods for performing modular exponentiation in cryptographic systems, in a manner that is more secure against side-channel attacks.

BACKGROUND

Simple Power Analysis (SPA) is a technique that involves directly interpreting power consumption measurements collected during cryptographic operations. SPA can yield information about a device's operation as well as key material.

Using SPA, modular squaring operations can be distinguished from modular multiplication operations by analyzing the different power consumption profiles produced when modular squares and modular multiplications are computed. In early cryptographic devices that used separate circuits for squaring and multiplication, power consumption differences between these operations could be quite large. Even when the same circuit is used for squaring and multiplication, the power consumption profiles can be significantly different due to the difference in computational complexity between modular squaring and modular multiplication operations. Systems may be compromised due to secret keys being leaked if modular squares can be differentiated from modular multiplications.

The difference in power profiles between squares and multiplications exists even when random inputs are submitted to a general multiplication circuit. (In this context "squaring" means exercising the circuit to multiply a parameter by itself.) An optimized squaring operation can be faster than a multiplication. But independent of any speed optimizations, the computational complexity of a square—measured by counting the number of transistors that switch during the operation—is lower when averaged over many random inputs than the average complexity of many multiplications with different random inputs. Therefore, if the same circuit performs the squaring and multiplication operations, the squaring and multiplication operations can often be distinguished from one another and exploited, if care is not taken to level the differences.

Many cryptographic algorithms, like RSA and Diffie-Hellman, involve performing modular exponentiation. To improve speed of computation, methods have been devised to perform the exponentiation by squaring, often called "square-and-multiply" algorithms. Examples of square-and-multiply algorithms for modular exponentiation include left-to-right square and multiply; right-to-left square and multiply; k-ary exponentiation; sliding window method; and Montgomery powering ladder.

FIG. 1A shows a square-and-multiply algorithm where b is raised to an exponent 100111010110101, corresponding to a decimal value of 20149. The base is denoted by b, and A is an accumulator. After initialization by 1, the exponent can be built up cumulatively one bit at a time from the left to right as $(1, 0, 0, 1, 1, 1, \ldots)=(1, 2, 4, 9, 19, 39, \ldots)$. In other words, the exponent can be constructed using a series of steps, where each step depends on the bit in that step and the result from the previous step. If the bit is 0, the operation comprises squaring the previous result. If the bit is 1, the operation comprises squaring the previous result and multiplying the square with the base b. If no SPA or differential power analysis (DPA) countermeasures are used, then in the left-to-right and right-to-left square-and-multiply algorithms for exponentiation, an attacker who can differentiate squares from multiplies can determine the complete exponent being used.

FIG. 1B illustrates a power trace of the modular operations in an exponentiation scheme in which a table of various powers of b are precomputed: $b^0$, $b^1$, $b^2$, $b^3$. (The value $b^0$ is equivalent to 1.) In this scheme, there are always two squares followed by a multiplication by one of the table entries. This square-square-multiply algorithm produces a very symmetrical power trace of two consecutive lows and one high (SSM SSM SSM SSM . . . ) in the power profile. (This is the k-ary exponentiation algorithm, with k—the maximum number of exponent bits that are processed per multiplication—equal to 2.) Since the pattern of squares and multiplies is always SSM, regardless of the bits of the exponent, distinguishing squares from multiplies is not sufficient to reveal the key. This allows the secret key to be hidden, and may protect the system against certain SPA attacks. However, an attacker who can distinguish one type of multiplication from another can still gain information about the key.

Some methods omit the multiplication by 1, or use dummy multiplications by another value (discarding the result) in an effort to mask the power trace. Multiplying the previous result by 1 produces the same output as the previous result, and thus the output does not have to be discarded. Omitting the multiplication by 1 leaves a potentially detectable SPA characteristic. The extra step of discarding the output of a dummy operation might also be detectable by SPA. Even if the multiplication by 1 is not omitted, the operation has low computational complexity and does not require much computational power. As a result, an attacker may be able to decipher multiplications by 1 anyway based on their power profiles.

In FIG. 1B, for example, an attacker may be able to detect when multiplications by 1 occur by analyzing the power trace, and determine that the two exponent bits at those locations are zero. (Note that in FIG. 1B, for convenience a sequence square-square-multiply-by-$b^x$ is referred to as SSX. The sequence of operations includes multiplications by $b^0$, $b^3$, $b^2$, $b^2$, $b^3$, $b^1$, and $b^1$, and is therefore denoted as SS0SS3SS2SS2SS3SS1SS1.) An attacker who can identify the multiplications by 1 (that is, by $b^{00}$) may not be able to decode the remaining non-00 exponent bits (e.g. 01, 10, or 11) using SPA because of the uniformity of the power profiles at those multiplication locations. Subsequently, the attacker may only be able to obtain approximately a quarter of the exponent bits using this approach, which may or may not be sufficient to break the security of the cryptosystem.

FIG. 1C illustrates the clustering of multiplications into sets based on slight differences in the power profiles for different multiplications. As stated earlier, an attacker may be able to detect the locations of the 00 exponent bits, but may not be able to determine the actual values of the non-00 bits. In other words, the attacker may not be able to distinguish whether a multiplication is by a base to the first power, second power, or third power. In practice, however, most devices usually have some leakage, and each type of multiplication may display a different characteristic.

For example, as shown in FIG. 1C, the power profile for multiplication operations for bits 11 (decimal value 3) may display a tiny spike at the front of a step. Similarly, the power profile for multiplication operations for bits 10 (decimal value 2) may display a tiny spike at the middle of a step, and the power profile for multiplication operations for bits 01 (decimal value 1) may display a tiny spike at the end of a step. If these tiny spikes features can be observed in an individual power trace, an attacker may be able to classify these multiplications into three different sets (A, B, C) corresponding to $b^1$, $b^2$, $b^3$, (or simply "1", "2", "3", although the correspondence may at first be unknown to the attacker). To further confirm the classifications, the attacker can repeat encryptions of the same message and average the results of the power profiles over a number of exponentiations, for example over 1000 exponentiations, to observe these fine-scale differences between the multiplications. If the attacker is successful in clustering the different multiplications into sets of (A, B, C), it is relatively easy for the attacker to decipher the exponent key by performing a search. In the example of FIG. 1C, there are only 6 ways that (A, B, C) can map to (1, 2, 3), thus the exponent key may potentially be deciphered using less than a 3-bit search.

One countermeasure to the above problem is to mask the exponent and randomize the masking of the exponent in different computations such that the sequence of operations may be entirely different in a subsequent computation. For example, if the first and last operations both belonged to a cluster A in for the first exponent, then with the next exponent it may be that the first operation corresponds to a cluster D, while the last operation is in a different cluster, E. If the exponent is being randomized from one computation to the next, an attacker will have to be able to perform a clustering successfully (and correct all errors) from a single power trace, which increases the difficulty in deciphering the exponent key. (Exponent randomizing methods in a group with order phi(N) are well known in the background art, and include such methods as using (d'=d+k*phi(N)) in place of d, splitting d into (a, b) such that a+b=d, or such that b=$(d*a^{-1})$ mod phi(N).)

FIG. 1D illustrates the application of the sliding window algorithm to the exponent 100111010110101 of FIG. 1B. The sliding window algorithm can reduce the amount of pre-computation required when compared to the square-square-multiply exponentiation in FIG. 1B, by reducing the average number of multiplications performed (excluding squarings). Thus, the sliding window algorithm is more efficient and requires fewer memory locations to store entries.

As shown in FIG. 1D, the sliding window algorithm translates the sequence SS2 (i.e. square, square, multiply by $b^2$) into a different sequence S1S (square, multiply by $b^1$, square). The sequence S1S is equivalent to bit 2 (10) because S1 S comprises a square multiplier S (0) followed by 1S (10). By replacing all the SS2's with S1S's, the value 2 can be omitted from the table. Thus, the sliding window algorithm allows for one less table entry, with the resulting table having only entries (0, 1, 3). This reduction in memory location can reduce the number of parts required for manufacturing the device and can provide cost benefits, especially if the manufacturing of the device is sensitive to cost.

FIG. 1D further shows another way to reduce the number of multiplications in the sliding window algorithm. As stated earlier, the bits 0110 corresponding to SS1|SS2 can be replaced with SS1|S1S. SS1|S1S still uses two multiplications (each by 1). However, using the sliding window algorithm, the two multiplications can be reduced to only one multiplication if the sequence SS1|S1S is translated to sequence S|SS3|S, which has only one multiplication (by 3). From the table, it is seen that the sequence S|SS3|S also corresponds to bits 0110. Therefore, in the sliding window algorithm, the exponent does not always have to be divided into 2-bit blocks (hence the term "sliding"), and the number of multiplications can be reduced by looking at each bit from left to right along the exponent and using the methods described above.

FIG. 1E illustrates a way of decoding the exponent in the sliding window algorithm based on a power profile. As indicated in FIG. 1E, in the sliding window algorithm, there is a decision point at the first bit 1, and at every subsequent non-zero bit (i.e. bit 1). The multiplication step in the algorithm does not occur until the decision point is reached. Depending on the next bit in the exponent, the algorithm can execute one of the following two operations. If the next bit after the decision point is a 0 (i.e. the 2-bit value is 10), the algorithm inserts an S1 S (instead of a SS2, since the table no longer has an entry 2). If the next bit after the decision point is a 1 (i.e. the 2-bit value is 11), the algorithm inserts an SS3.

An attacker may typically see sequences of many squares in a power profile where a sliding window algorithm is used. With the simple binary algorithm, an attacker who can differentiate squares from multiplies can decode them to completely recover the exponent. With the sliding window algorithm, some multiplies correspond to 1 (multiplications by $b^1$), while others correspond to 3 (i.e. $b^3$). Although this results in some ambiguity in decoding the exponent, an attacker still knows that every sequence SSM corresponds to a two-bit section of the exponent where the low-order bit is 1: i.e. the exponent bits are "?1". Additionally, in any sequences of S's between M's, the attacker knows that all but the last two S's before an M must correspond to bits of the exponent that are 0. Together, these facts allow much of the exponent to be decoded. Furthermore, there are some cases where two M operations occur with fewer than k squares between them, which results from certain exponent bit patterns. When this occurs, it reveals additional bits of the exponent that are zero. For example, when k=3, the sequence MSM can occur which is not possible in the straight k-ary exponentiation algorithm. (In FIG. 1E this is characterized by high-low-high power in the power trace.) When this pattern occurs (for the sliding window algorithm with only 1 and 3 in the table), it can only mean that the exponent bits were '1110'. This fact may in turn allow the decoding of bits before and after the segment. A closer examination of the power profiles surrounding the MSM sequence in the example of FIG. 1E shows that the MSM sequence is part of a longer sequence of SSM|SMS|SMS must correspond to 111010. In other words, the attacker is able to determine the values (3, 1, 1) at these locations. By analyzing the full power trace in view of the above MSM sequence and S . . . SS sequences, the attacker may be able to decode one-third or possibly two-thirds of the bits in the exponent. If the attacker is able to decode at least half of the bits in the exponent, the attacker may be able to solve for the exponent analytically. In some cases, decoding one quarter of the bits—or even a few bits per exponentiation—may be sufficient to break the cryptosystem.

Furthermore, the attacker may be able to visually identify sets of 0's, 1's, and 3's by averaging the power profiles over thousands of exponentiations, and looking for characteristics at each MSM location (3, 1) and the remaining unknown multiplication locations, similar to the method discussed with reference to FIG. 1C. In this case, the attacker may, for example, determine that out of the identified MSM locations in the power trace, ten locations correspond to 3's, and five locations correspond to 1's. The attacker can then compare the known power profiles of 1's and 3's at these known MSM locations with the remaining unknown multiplications at other locations (for example, 200 multiplications may be unknown) along the power trace. If the attacker is able to cluster the bits (0, 1, 3) into three sets, the attacker can then decode the exponent entirely.

DPA and Higher Order DPA Attacks

Previous attempts have been made to foil SPA by masking the exponent value. Masking of intermediate values in modular exponentiation can help resist against DPA attacks. For example, in typical blinded modular exponentiation, an input can be effectively masked or randomized when the input is multiplied by a mask that is unknown to the attacker. The masked or randomized input can later be unmasked at the end of the operation. Such masking may take advantage of modular inverses, such that $(X*X^{-1})$ mod $N=1$. For example, $(A*(X^E))^D*(X^{-1})$ mod N is equal to $A^D$ mod N, for exponents D and E where $X^{ED}=X$ mod N.

Different masks are typically used for different operations, but are not changed in the middle of a modular exponentiation. Between operations, a new mask is sometimes generated efficiently from a previous mask by using a modular squaring. (i.e. if $I=X^E$ and $O=X^{-1}$ are pre-computed modulo N and stored, a new set of masks I' and O' can be computed efficiently by squaring with $I'=I^2$ mod N and $O'=O^2$ mod N.) However, designs in which the mask is updated only between exponentiations (and not within a single exponentiation) can be vulnerable to DPA and higher order DPA attacks in the form of cross-correlation attacks. These cross-correlation attacks are clustering attacks similar to the SPA clustering attacks described above, but employing statistical methods to identity the clusters. In contrast to a regular DPA attack which targets a specific parameter at one point, higher order DPA attacks target the relationship(s) between the parameters by using multiple power measurements at different locations in the trace to test the relationship(s). If the input parameters are the same in those locations, those parameters will have higher correlation, compared to the locations in which the parameters have no relationship (i.e. different parameters). In many cases, a correlation is detectable if even one parameter is shared between two operations—for example, a multiplication of $A_1$ by $B^3$, and the second, a multiplication of $A_2$ by $B^3$. A cross-correlation attack allows an attacker to test for this correlation between operations caused by shared use of a parameter.

The doubling attack and the "Big Mac attack" are two types of cross-correlation attacks. The doubling attack is described in a paper authored by P. Fouque and F. Valette, titled "The Doubling Attack—Why Upwards is Better than Downwards," CHES 2003, Lecture Notes in Computer Science, Volume 2779, pp. 269-280. The "Big Mac" attack is a higher order DPA attack, and is described in the paper authored by C. D. Walter, titled "Sliding Windows Succumbs to Big Mac Attack," published in CHES 2001, Lecture Notes in Computer Science, Volume 2162, January 2001, pp. 286-299.

The doubling attack targets designs in which the masks are updated by squaring, and looks at the relationship between the j'th operation in the k'th trace and the (j−1)'th operation in the (k+1)'th trace. For exponentiation algorithms such as sliding window, the operations will share an input if and only if the j'th operation in the k'th trace is a square—and the correlation between variations in the power measurements is often higher in this case.

In the "Big Mac" attack, an attacker identifies all of the multiplications in a single trace, and attempts to identify clusters of operations that share a multiplicand. For example, in the SSM example of FIG. 1C, there are four types of multiplication: by 1, $b^1$, $b^2$, and $b^3$. If an obvious SPA characteristic has not been found that allows the multiplications by 1 and clusters A, B, and C to be determined, an attacker may still be able to determine cluster classifications by mounting a cross-correlation attack.

The attack begins by dividing the trace into small segments, with each segment corresponding to a square or multiplication. The correlation between one multiplication and the next is calculated between the small segments corresponding to each operation. (A Big Mac attack can also work with many traces—especially if the exponent is not randomized.)

More generally, cross-correlation attacks can look for any relationship between operations. If the attacker can determine the relationship between the input to a particular square or multiplication, and an input or output of some other operation, the attacker can then obtain information about the secret key and undermine the design's security. As another example, if the multiplication by 1 (in FIG. 1B) were replaced by a multiplication by another value (discarding the result), then a correlation may appear between the output of the operation before the dummy mult and the input of the operation after the dummy. In general, an attacker can perform cross correlation attacks by analyzing correlation relationships across different operations that share an input or output, or where the output of one is an input of the other. These relationships can be summarized in terms of which parameters are in common between the LHS (Left Hand Side), RHS (Right Hand Side), and OUT (output) parameters.

For example, if the same LHS ("L") parameter is used in different multiplications but the RHS ("R") parameters are different between or among those multiplications, an L-L relationship exists between those multiplications.

Conversely, if the same R parameter is used in different multiplications but the L parameters are different between or among those multiplications, an R-R relationship exists between those multiplications.

Furthermore, if the L parameter in one multiplication is the R parameter in another multiplication, then an L-R relationship exists between those multiplications.

A final category comprises of relationships where the output of one multiplication ("O") is the input to another multiplication. This may correspond to a O-L (Output-LHS), O-R (Output-RHS), or O-O (Output-Output) relationship between those multiplications.

If a multiplier deterministically uses the above parameters in a particular manner, then feeding the same LHS parameters into two different multipliers will result in the two multipliers operating on these parameters in the same way when combined with the RHS parameter. As a result, if there is a power leak which reveals information about the LHS parameter, and if the leak can be expressed as $H_1(L)$, an attacker feeding the same LHS parameter into the multipliers will obtain the same $H_1(L)$ leak and observe the similarity in the leak.

Leakage functions commonly involve a function of the L, R, or O parameters. A typical leakage function may also leak the higher bit of each word of L. For example, if L is a Big Integer represented using 32×32-bit words, an attacker can obtain 32 bits of information about L. This is a hash function because it is compressed and has a constant output size of 32 bits. However, this hash function is not cryptographically secure because an attacker can determine the exact values of the 32 bits, and many bits of L do not influence/affect the compression function.

An attacker who knows 32 bits of information about L, and who feeds the same L into a given leakage function for each bit of the word, may be able to immediately detect if there is a collision. Collisions for other L's that are similar can also be detected because only 32 bits are needed to be the same in order to obtain a collision.

However, if an attacker is performing a modular exponentiation and submitting a RAM sequence of messages to compare values at different locations, the probability of triggering a collision is low for the L-L relationship unless the values are identical. This also applies for the R-R relationship. When an attacker observes a word (or a parameter) with 2 bytes that are zero in the same locations, the attacker can determine that the word/parameter is the same between the two cases, and can thus determine the bytes of R that are zero. However, there may be numerous operations in which the parameters are different and no leakage is triggered in those operations.

For example, in an L-R relationship, the two leakage functions are different from each other. In some cases, the leakage function R is triggered only when the entire value of a byte is 0, and the leakage function L is triggered only when the entire value of the byte is 0 and the higher bit is 0. As such, in cases where the higher bit is 1, a leakage function L will not be triggered. An attacker may also observe R as a function of L, with the leakage function spreading the higher bits of L over the range of the leakage of the bytes of R that occur in between multiplication locations. As a result, it is more difficult for an attacker to precisely exploit an L-R relationship.

Lastly, the O-L, O-R, and O-O relationships are significantly harder to exploit, although one way to exploit those relationships may be to transform the trace first before performing the correlation calculation. (The O-L and O-R correlations are particularly relevant, for example, when attacking the Montgomery Ladder exponentiation system.)

In contrast to the leakage function $H_1(L)$ which relates to functions on the left hand side, the leakage function $H_2(R)$ relates to functions on the right hand side. An attacker may be able to determine when a whole word is zero, and distinguish a zero from a non-zero. The attacker can also determine the bits of the higher order byte of the output, and may even be able to determine the entire value of the output.

FIG. 1F shows an exponentiation using the k-ary square-and-multiply-always algorithm, where the system is vulnerable to both a doubling attack and a clustering attack. In the example of FIG. 1F, the exponent comprises of dummy multipliers (discardable multiplies) inserted between every pair of squares in an SMSSMSS . . . pattern, which results in a SMSMSMSMS . . . pattern.

As shown in FIG. 1F, the first squaring operation on input i begins from the leftmost bit and results in $i^2$, which is the product of i*i. The next bit corresponds to a multiplication operation, where $i^2$ is multiplied by i to yield $i^3$. The subsequent squaring operation on the output of the previous multiplication results in $i^6$ (which is given by $i^3*i^3$). The following is a dummy multiplication, corresponding to a blinded representation (of the dummy multiplier 1). In the dummy multiplication, the output of the previous squaring operation ($i^6$) is multiplied by i to yield $i^7$. However, the output $i^7$ from this dummy multiplication is discarded. In other words, the output $i^7$ of the dummy multiplication does not constitute input for the next squaring operation. Instead, the output of the previous squaring operation ($i^6$) is provided as input to the following squaring operation, which yields $i^{12}$ (given by $i^6*i^6$).

A cross-correlation attack in combination with a clustering attack may be performed in the example of FIG. 1F. Specifically, an attacker may perform a doubling attack by comparing an operation k+1 in a first trace, with an operation k in a second trace, and analyzing the correlation in power consumption between the operation k+1 in the first trace and the operation k in the second trace. The attacker can next perform a clustering attack which is described as follows.

For example, with reference to FIG. 1F, the first multiplication operation comprises an L parameter (2) and an R parameter (1); and the second squaring operation comprises an L parameter (3) and an R parameter (3). The correlation from the first multiplication operation to the second squaring operation can be denoted as α, comprising an L-L correlation (2-3) and an R-R correlation (1-3). The L-L and R-R correlations with respect to α are not expected to be significant. Also, although there is an output-input correlation, this correlation is usually difficult to detect unless an attacker specifically attacks this correlation.

Next, the dummy multiplication operation comprises an L parameter (6) and an R parameter (1); and the third squaring operation comprises an L parameter (6) and an R parameter (6). The correlation from the first multiplication operation to the second squaring operation can be denoted as β, comprising an L-L correlation (6-6) and an R-R correlation (1-6). As stated previously, the output $i^7$ from the dummy multiplication is discarded. However, if the L-L correlation is significant, one would expect to observe a higher correlation in the case where the result/output from one operation is discarded (in β) than in the case where the result/output is not discarded (in α). Thus, an attacker may be able to successfully perform a cross-correlation attack and a clustering attack on the exponent in FIG. 1F, even though dummy multipliers have been inserted to create a symmetrical square-and-multiply-always pattern (SMSMSMSMS).

With reference to FIG. 1F, it is noted that if the dummy multiplication results are discarded, special circuitry is required to process the discarded data, and to control whether an output is sent to the accumulator or whether the output is discarded. Typically, this processing can also be performed using software instead of special circuitry. Nevertheless, the software manipulations can be vulnerable to SPA attacks because even though the sequence of squares and multiplies is the same, gaps can exist between locations where the multipliers are not active. In those gaps, the processor is performing computations to determine which parameter to load (or the processor may also be copying parameter into another location). As a result, the timing of those gaps may leak significant power. In some instances, even the standard squares and multiplications can have significant SPA leakage, depending on the computations performed by the processor and the sequence of operations.

BRIEF DESCRIPTION OF THE DRAWINGS

The accompanying drawings, which are incorporated in and constitute a part of this specification, together with the description, serve to explain the principles of the embodiments described herein.

FIG. 1A illustrates an exponentiation system.

FIG. 8C shows how collisions between values may be detected by an attacker.

DETAILED DESCRIPTION

Figure 1B:
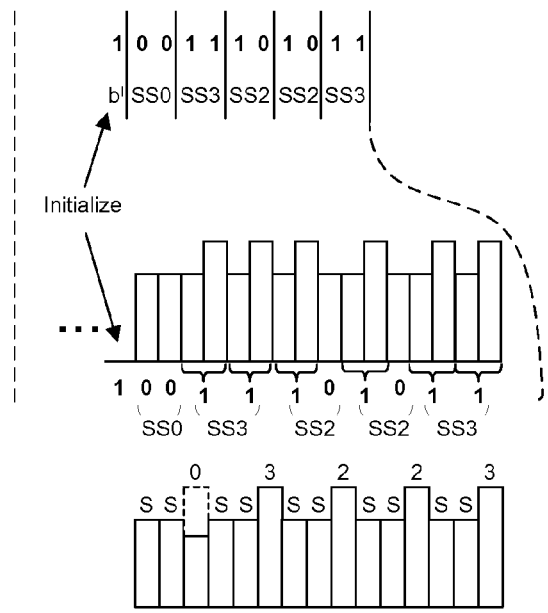
FIG. 1B illustrates a power trace of the modular operations in an exponentiation scheme in which there are always two squares followed by multiplication by one of the table entries.
Figure 1C:
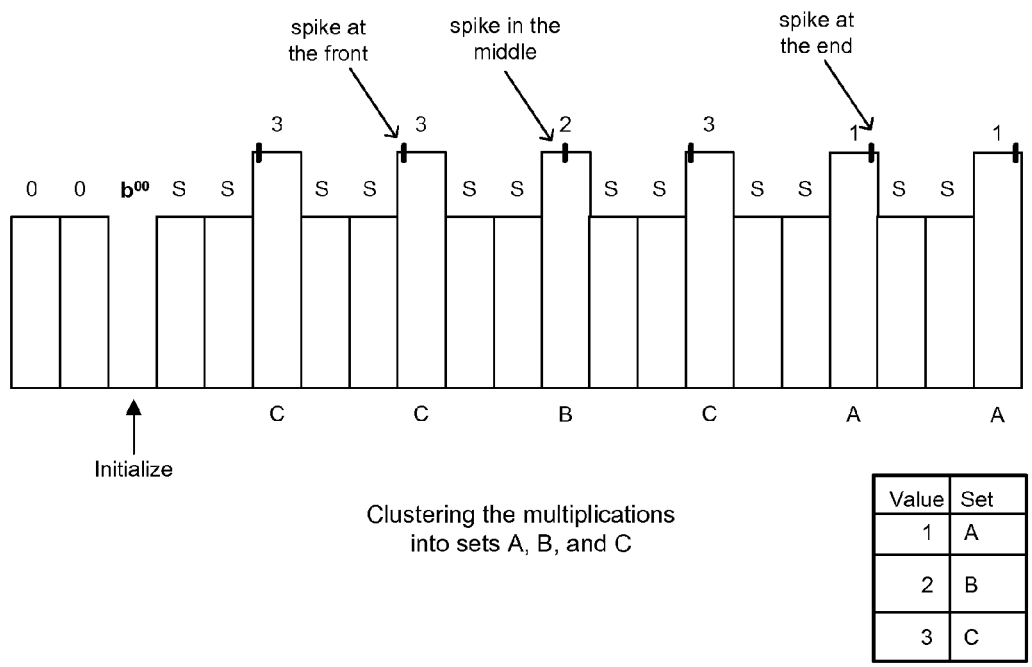
FIG. 1C illustrates the clustering of multiplications into sets based on slight differences in the power profiles for different multiplications.
Figure 1D:
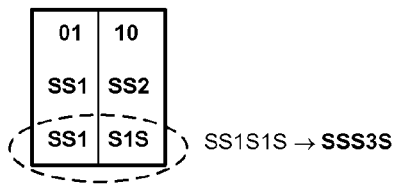
FIG. 1D illustrates the application of the sliding window algorithm to the exponent 100111010110101 of FIG. 1C.
Figure 1D:
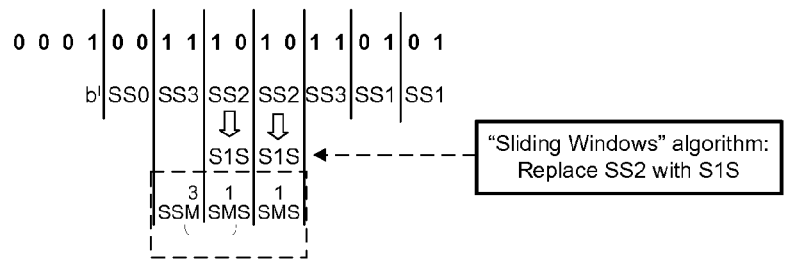
Figure 1E:
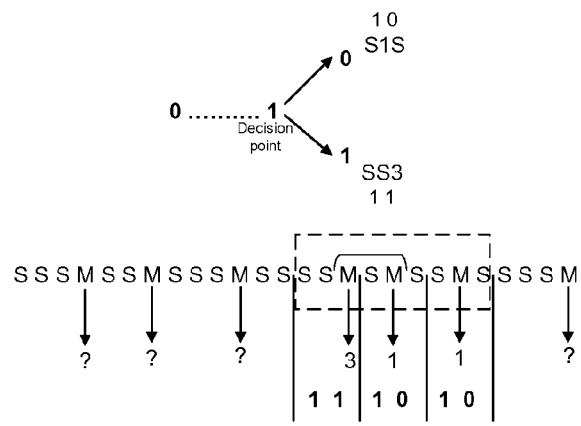
FIG. 1E illustrates a way of decoding the exponent in the sliding window algorithm.
Figure 1E:
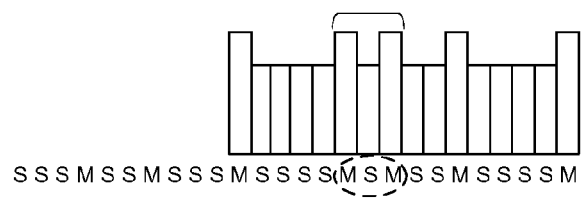

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be taken in a limited sense.

Methods and systems for masking certain cryptographic operations in a manner designed to defeat SPA attacks are disclosed herein and referred to as Asymmetrically Masked Multiplication ("AMM"). In embodiments of AMM described herein, squaring operations are masked to make squaring operations indistinguishable or less recognizable from multiplication operations. The goal in masking at least a small number of squares as multiplications is—if they are indistinguishable from other multiplies—to defeat simple SPA attacks, and potentially increase the difficulty of clustering attacks.

In general, squaring operations are converted into multiplication operations by masking them asymmetrically. This can be achieved because squares are a subset of multiplication—that is, squares are multiplications in which the LHS and RHS parameters are the same—and a masking strategy that treats the LHS different from the RHS results in a multiplication in which the two inputs are not identical. Although squaring operations are a subset of multiplications, the subset also behaves differently from two-input multiplications in general, in terms of the number of transistors that may switch on average (over many inputs) during the operation, and in terms of optimizations that may be applied.

In some embodiments, AMM comprises inserting additional multiplications or using more multiplications than necessary in an exponentiation operation. The approach may involve using these multiplications to multiply a blinding factor into the exponentiation result, or to update the masked (blinded) representation of parameters stored in a table.

In some embodiments, AMM comprises transforming a square of an input into a multiplication in which a mask value may be added to one copy of the input and subtracted from another, and an output is obtained where the result is a square of the input added to some mask parameter. In one embodiment, the mask parameter may be independent of an input value A. In some embodiments, the mask on an output parameter is efficiently transformed into the input mask on a subsequent operation, and therefore sequences of squares may be transformed into masked multiplications, while maintaining only a small number of mask parameters.

Applying AMM to Unmasked Squaring and Multiplication Operations

FIGS. 2A, 2B, 3A, 3B, and 4A-C describe different embodiments of masking consistent with the principles described herein.

Figure 2A:
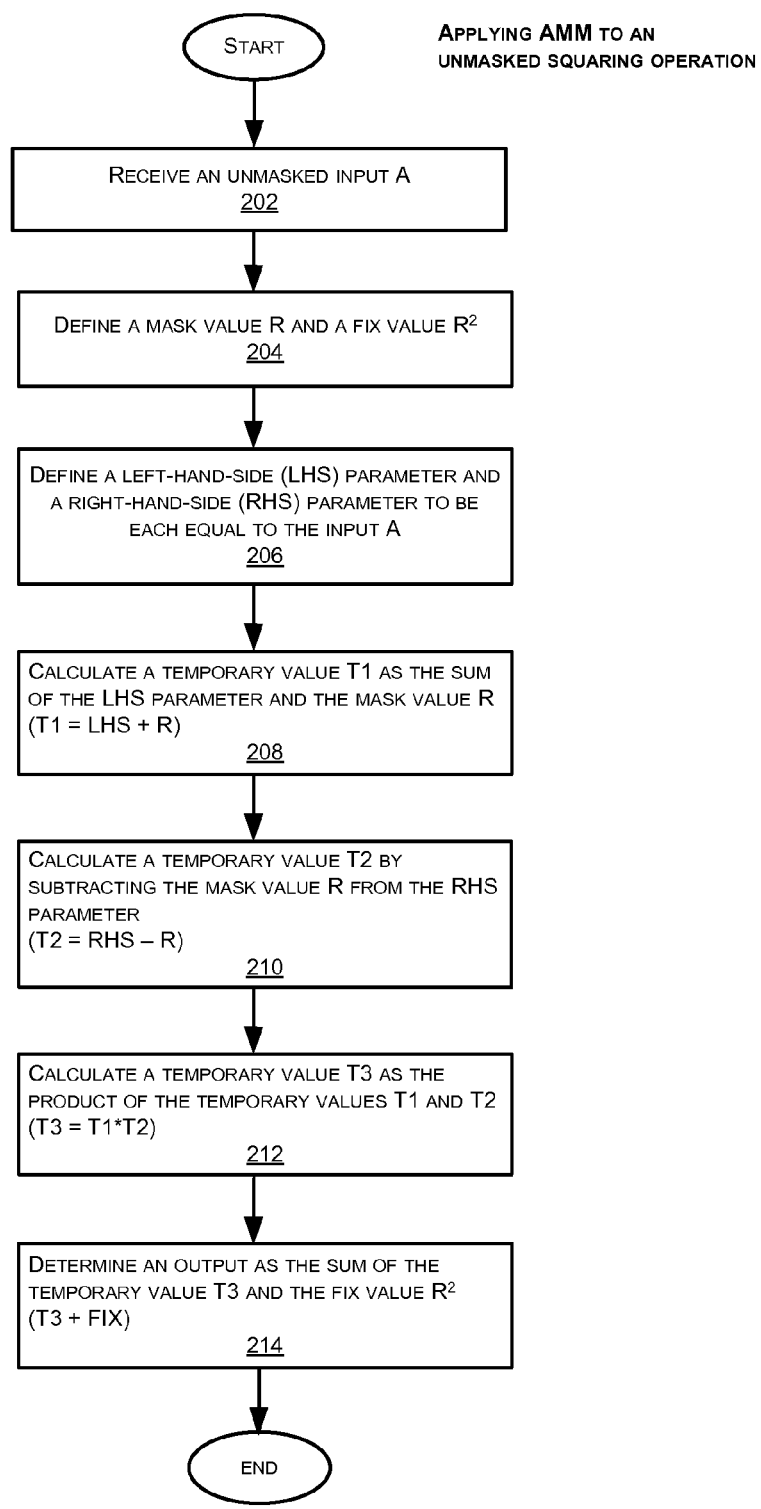
FIG. 2A illustrates an exemplary method for performing Asymmetrically Masked Multiplication ("AMM") on an unmasked squaring operation consistent with the invention.

FIG. 2A illustrates an exemplary method for performing AMM on a squaring operation consistent with the invention. Specifically, the method shown in FIG. 2A masks a squaring operation ($A \rightarrow A^2$) by converting the square into a series of intermediate addition, multiplication, and subtraction steps to derive the final squared value. Also, the method of FIG. 2A begins and ends with unmasked parameters (i.e. both the input and output values are unmasked). It is noted that all additions, subtractions and multiplications may be performed using modular arithmetic.

Referring to FIG. 2A, an unmasked input value A is received (step 202). Next, a mask value R and a fix value $R^2$ are defined (step 204). The fix value can be described as an unmasking parameter.

Next, a left-hand-side (LHS) parameter and a right-hand-side (RHS) parameter are each defined to be equal to the input A (step 206). The LHS and RHS parameters are equal in a (or any) squaring operation.

LHS=A

RHS=A

Next, temporary values T1, T2, and T3 are calculated in steps 208, 210, and 212. These temporary values represent outputs of different arithmetic operations on combinations of the above LHS and RHS parameters, mask value, and fix value. In step 208, the temporary value T1 is calculated as the sum of the LHS parameter and the mask value R:

T1=LHS+Mask

->T1=A+R

In step 210, the temporary value T2 is calculated by subtracting the mask value R from the RHS parameter:

T2=RHS-Mask

->T2=A-R

In step 212, the temporary value T3 is calculated by multiplying temporary value T1 and temporary value T2:

T3=T1*T2

->T3=(A+R)*(A-R)=A²-R²

Finally, in step 214, an output is determined as the sum of the temporary value T3 and the fix value R².

Output=T3+FIX

->Output=(A²-R²)+R²=A²

As shown above, the output from step 214 is the value A², which is the square of the input value A. By performing the method of FIG. 2A on the squaring operation, the left hand side and the right hand side parameters are not identical during the multiplication in step 212, which prevents any square-based optimizations from being applied by the multiplying circuit. Furthermore, the temporary values T1, T2, and T3 are effectively masked within the intermediate steps 208, 210, and 212, respectively, (i.e. their values are not directly correlated to the value of A) because either an R or R² value has been incorporated into each of these temporary values.

Figure 2B:
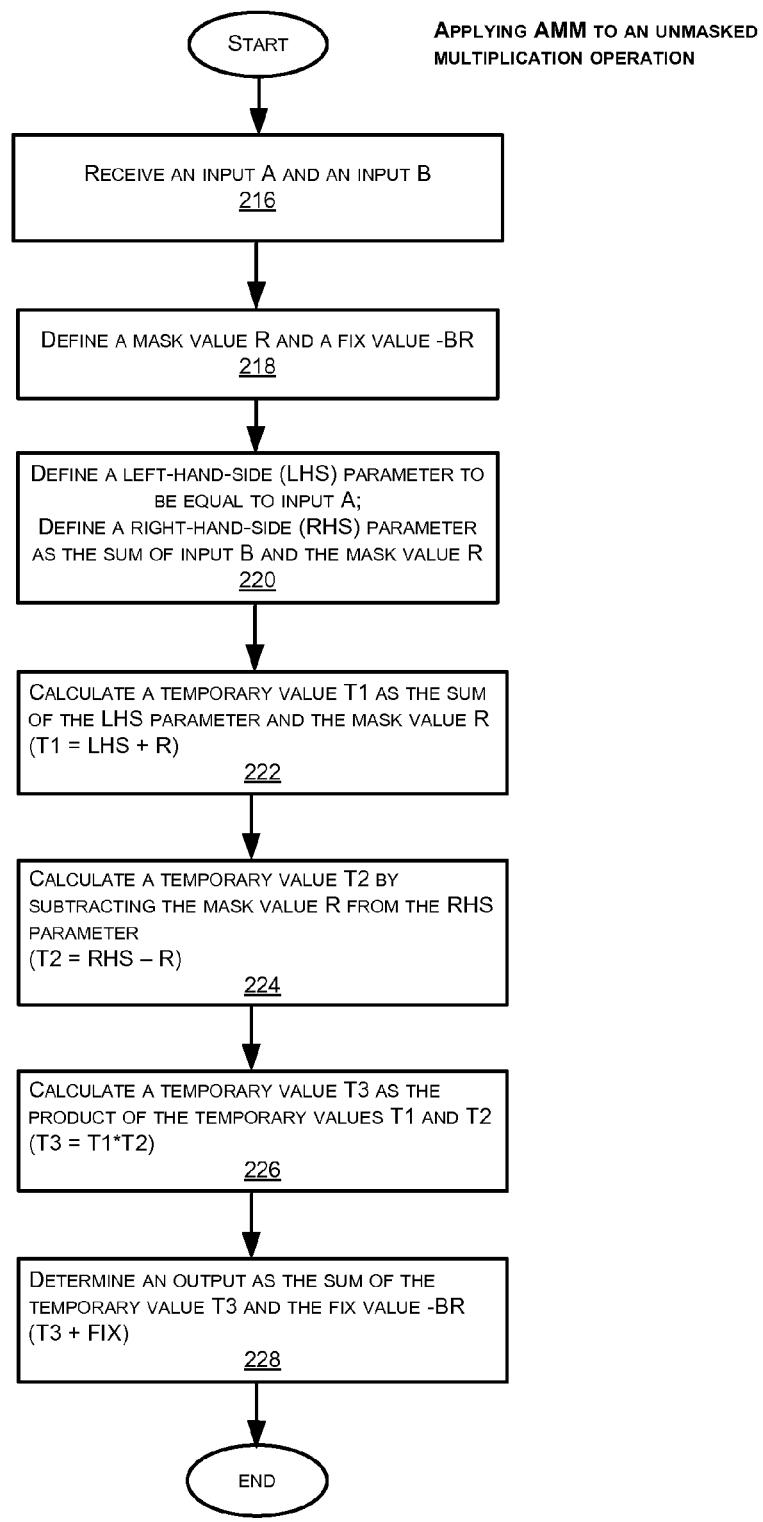
FIG. 2B illustrates an exemplary method for performing AMM on an unmasked multiplication operation consistent with the invention.

In some embodiments, AMM can also be performed on a multiplication operation as shown in FIG. 2B. Specifically, the method shown in FIG. 2B masks a multiplication operation (A*B) by converting the multiplication into a series of intermediate multiplication, addition, and subtraction steps to derive the final multiplication value. This process of using a sequence of addition, subtraction and multiplication steps around the non-square multiplications may be important part of making the power signature of these operations indistinguishable from AMM squares. As in FIG. 2A, the method of FIG. 2B begins and ends with unmasked parameters (i.e. both the input and output values are unmasked).

Referring to FIG. 2B, an unmasked input A and an unmasked input B are received (step 216), where A and B are different values. Next, a mask value R and a fix value (-B*R) are defined (step 218). The fix value (-B*R) is the unmasking parameter in the method of FIG. 2B. Alternatively, the fix value can be a function of A if (-A*R) is chosen as the fix value instead of (-B*R). Therefore, the fix value is always a function of at least one of the input values.

Unlike the squaring operation in which both the LHS and RHS parameters are defined to be the same as the input value, the LHS and RHS parameters in a multiplication operation are different from each other. In step 220, a LHS parameter is defined to be equal to input A, while a RHS parameter is defined as the sum of input B and the mask value R.

LHS=A

RHS=B+R

Next, temporary values T1, T2, and T3 are defined. These temporary values represent outputs of different arithmetic operations on combinations of the above LHS and RHS parameters, mask value, and fix value. In step 222, the temporary value T1 is calculated as the sum of the LHS parameter and the mask value R:

T1=LHS+Mask

->T1=A+R

In step 224, the temporary value T2 is calculated by subtracting the mask value R from the RHS parameter. It is noted that the step 224 produces an unmasked value of B (i.e. the masked RHS parameter is unmasked in step 224):

T2=RHS-Mask

->T2=(B+R)-R=B

In step 226, the temporary value T3 is calculated as the product of the temporary values T1 and T2:

T3=T1*T2

->T3=(A+R)*B

Finally, in step 228, the output is determined as the sum of the temporary value T3 and the fix value (-B*R).

Output=T3+FIX

->Output=(A+R)*B+(-B*R)=A*B

As shown above, the output from step 228 is the value A*B, which is the product of the input values A and B. It is noted that applying AMM to a multiplication operation may not be as efficient compared to applying AMM to a squaring operation. This is because applying AMM to a multiplication requires a fix value (-B*R), which is a function of the mask value and one of the input values. Since the fix value (-B*R) depends on the input B, (unlike the fix value R² in the method of FIG. 2A), the fix value (-B*R) can be computed and stored only after the value of B is known. If this method is used to mask only a single operation, then two multiplications (in steps 218 and 226) have been performed to produce one output.

However, if B is a constant that will be used in many multiplications, the fix value (-B*R) may be pre-computed. For example, in some embodiments, B is defined as a constant that can be re-used throughout a sequence of operations, such as in a modular exponentiation routine where the base B appears repeatedly on the right-hand-side (RHS). Also, in some other embodiments, the (-B*R) parameter may be pre-computed corresponding to different powers of the base in a table based on a windowing method, such as a k-ary algorithm or sliding window algorithm.

It is further noted that masking a small number of squaring operations using AMM squarings can make SPA attacks on modular exponentiation significantly harder, if an attacker cannot differentiate a squaring with AMM from other multiplications. As AMM squaring requires addition and subtraction steps that may be visible in the power consumption, its power signature profile may be most similar to AMM multiplication that has equivalent steps.

Because the mask R can be random and the unmasking value $R^2$ can be computed efficiently from it, the mask parameters R used for successive modular exponentiations may be completely independent and unpredictable. This may render a doubling attack impractical if AMM squares and multiplies are used for all operations in a modular exponentiation. Alternatively, a single pair of constant R and $R^2$ may be used across many computations—which still may provide security against SPA attacks. In another variant, different mask values R and $R^2$ are used at different points within a modular exponentiation. In another variant, the unmasking step in one operation may be eliminated or combined with (replaced by) a masking operation of a subsequent step.

Applying AMM to Masked Squaring and Multiplication Operations

Figure 3A:
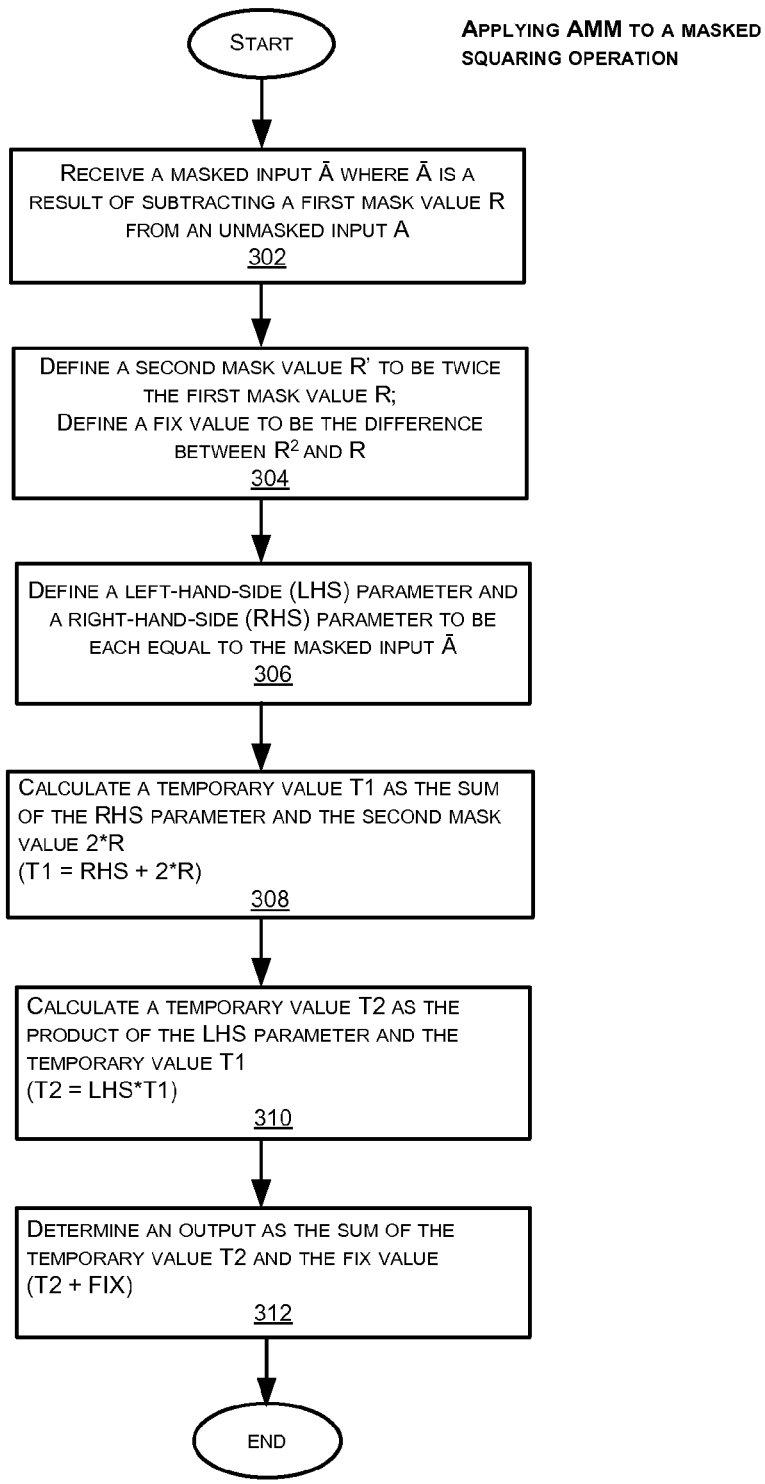
FIG. 3A illustrates an exemplary method for performing AMM on a masked squaring operation consistent with the invention.
Figure 3B:
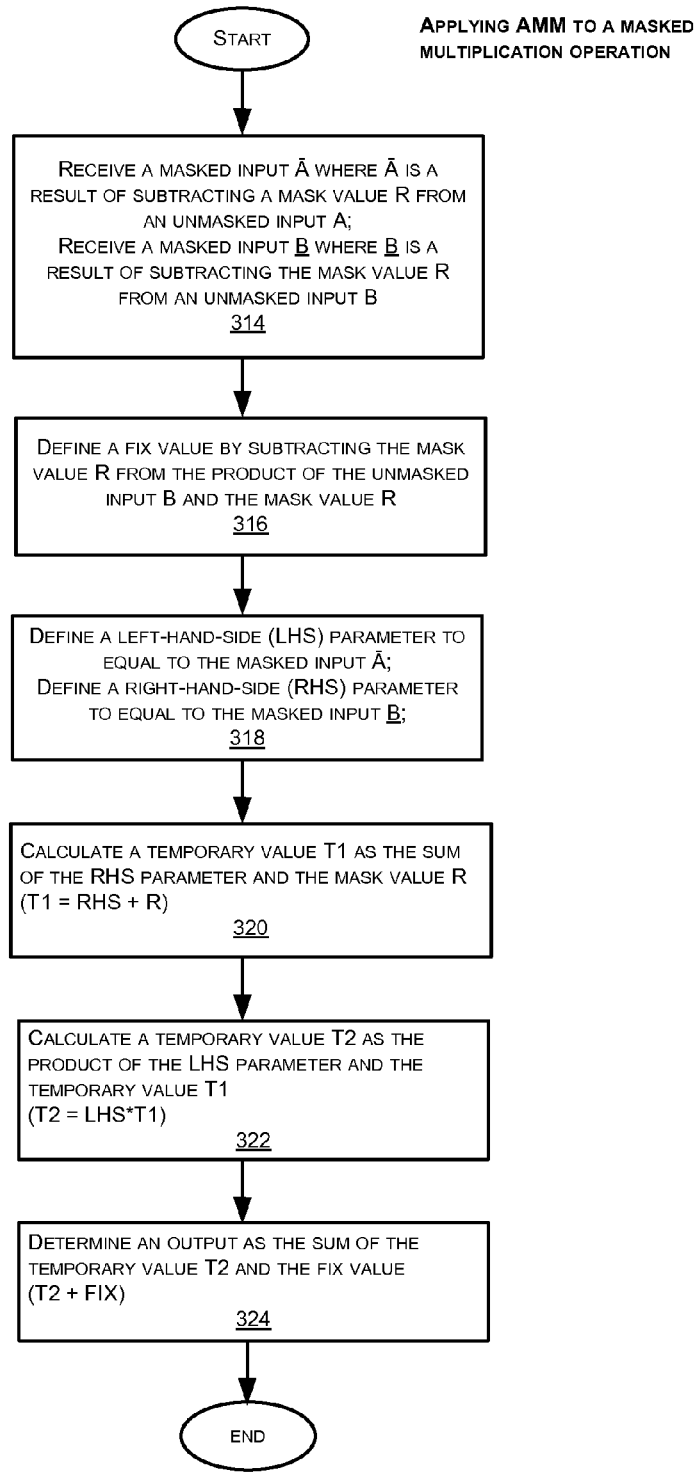
FIG. 3B illustrates an exemplary method for performing AMM on a masked multiplication operation consistent with the invention.

As illustrated in the exemplary methods of FIGS. 3A and 3B, AMM can be applied to a masked squaring operation (FIG. 3A), or a masked multiplication operation (FIG. 3B)—that is, to squaring or multiplications whose inputs are masked by a parameter R and whose outputs are also masked by R.

FIG. 3A illustrates an exemplary method for performing AMM on a masked squaring operation consistent with the invention. Specifically, the method shown in FIG. 3A further masks a masked squaring operation by converting a masked square into a series of intermediate multiplication, addition, and subtraction steps to derive the final masked squared value. Unlike the example of FIG. 2A, the method of FIG. 3A begins and ends with masked parameters (i.e. both the input and output values using this method are masked). An advantage to preserving the mask in both the input and output values is that preserving the same mask throughout the operations is computationally more efficient. In a typical modular exponentiation routine, there will be a sequence of masked multiplication and squaring operations, and it is more efficient to compute using the same mask throughout the operations rather than repeatedly unmask and re-mask at each subsequent operation.

Referring to FIG. 3A, a masked input value Â is received, where Â is a result of subtracting a first mask value R from an unmasked input value A (step 302).

$\hat{A}=A-R$

In step 304, a second mask value R' is defined to be twice the first mask value R, and a fix value (unmasking parameter) is defined to be the difference between $R^2$ and R.

$R'=2*R$ $FIX=R^2-R$

Next, a left-hand-side (LHS) parameter and a right-hand-side (RHS) parameter are each defined to be equal to the masked input Â (step 306).

$LHS=\hat{A}$ $RHS=\hat{A}$

Temporary values T1 and T2 are then defined in steps 308 and 310, respectively. These temporary values represent outputs of different arithmetic operations on combinations of the above LHS and RHS parameters, mask value, and fix value. In step 308, the temporary value T1 is calculated as the sum of the RHS parameter and the second mask value R', which is equal to 2*R:

$T1=RHS+R'$ $\rightarrow T1=\hat{A}+2*R$ $\rightarrow T1=(A-R)+2*R=A+R$

In step 310, the temporary value T2 is calculated as the product of the LHS parameter and the temporary value T1:

$T2=LHS*T1$ $\rightarrow T2=\hat{A}*(A+R)$ $\rightarrow T2=(A-R)*(A+R)=A^2-R^2$

Finally, in step 312, the output is determined as the sum of the temporary value T2 and the fix value ($R^2-R$).

$Output=T2+FIX$ $\rightarrow Output=(A^2-R^2)+(R^2-R)=A^2-R$

As shown above, the output of step 312 is the masked value ($A^2-R$), which contains the square of the unmasked input value A. So the input was masked by −R, the output is masked by −R, and by performing the method of FIG. 3A to perform the squaring operation as a multiplication in which the operands in step 310 are not identical. Also, each of temporary values T1 and T2 are effectively masked within intermediate steps 308 and 310, respectively, because either an R or $R^2$ value has been incorporated into each of these temporary values. Similar to the exemplary method of FIG. 2A, the temporary values T1 and T2 in FIG. 3A do not contain any term that is a product of A and R, and therefore R or $R^2$ is purely an additive mask.

Similarly, AMM can also be performed on a masked multiplication operation. FIG. 3B illustrates an exemplary method for performing AMM on a masked multiplication operation consistent with the invention. Specifically, the method shown in FIG. 3B performs a multiplication operation on a masked input by converting the multiplication into a series of intermediate multiplication, addition, and subtraction steps to derive a final masked output value. The steps in this series of operations are equivalent to the steps in an AMM square operation, in order to render them hard to distinguish by SPA. Unlike the example of FIG. 2B, the method of FIG. 3B begins and ends with masked parameters (i.e. both the input and output values are masked).

Referring to FIG. 3B, masked input values Â and B̂ are received, where Â and B̂ are different values (step 314). The masked input Â is a result of subtracting a first mask value R from an unmasked input value A, and the masked input B̂ is a result of subtracting the first mask value R from an unmasked input value B.

$\hat{A}=A-R$ $\hat{B}=B-R$

Next, a fix value is defined by subtracting the mask value R from the product of the unmasked input value B and the mask value R (step 316). This value may have been pre-computed at the time R was generated, if B were known at that time. Alternatively, it may be pre-computed as soon as a value B is known—and may be efficient to retain if the value B is used for more than one multiplication.

$FIX=B*R-R$

The fix value (B*R−R) is the unmasking parameter in the exemplary method of FIG. 3B. The fix value (B*R−R) contains a B*R term, and thus the fix value is a function of unmasked input value B. Alternatively, the fix value will be a function of A if (A*R−R) is chosen as the fix value instead. Thus, the fix value is always a function of at least one of the unmasked input values A or B. It may also be computed on the fly as a function of a masked input value Â or B̂, because $X*R-R=(X-R)*R+(R^2-R)$, and the value $(R^2-R)$ may be pre-computed and stored when R is generated.

In step 318, a left-hand-side (LHS) parameter is defined to be equal to the masked input $\hat{A}$, and a right-hand-side (RHS) parameter is defined to be equal to the masked input $\hat{B}$.

LHS=$\hat{A}$

RHS=$\hat{B}$

Next, temporary values T1 and T2 are defined in steps 320 and 322, respectively. These temporary values represent outputs of different arithmetic operations on combinations of the above LHS and RHS parameters, mask value, and fix value. In step 320, the temporary value T1 is calculated as the sum of the RHS parameter and the mask value R:

$T1$=RHS+Mask

->$T1=\hat{B}+R$

->$T1=(B-R)+R=B$

It is noted the temporary value T1 is the unmasked input value B. In other words, the masked input $\hat{B}$ (RHS parameter) becomes unmasked in step 320. However a modular exponentiation input that was multiplicatively blinded at the start of the computation will remain blinded at this step; only the additive value R has been unmasked from it here.

In step 322, the temporary value T2 is calculated as the product of the LHS parameter and the temporary value T1.

$T2$=LHS*$T1$

->$T2=\hat{A}*B$

->$T2=(A-R)*B$

Finally, in step 324, the output is determined as the sum of the temporary value T2 and the fix value (B*R−R).

Output=$T2$+FIX

->Output=$(A-R)*B+(B*R-R)=A*B-R$

As shown above, the output from step 324 is the masked multiplication result (A·B−R), which contains the product of the unmasked input values A and B.

In some embodiments, the input value B (or A) that is used in the fix value is defined as a constant. In these embodiments, the fix value can be computed more efficiently because it depends only on the constant input value and the mask value (which is also constant).

In left-to-right exponentiation algorithms, the non-square multiplication operations typically update the value of an accumulator with the product of the previous contents of the accumulator by a base value or power of the base value, and the multiplicand is a pre-computed parameter that is constant across an exponentiation by a particular base. In some embodiments, a pre-computed power of the fix value comprising a B*R−R term may be stored for each pre-computed power of the base.

Applying AMM to an Exponent

Figure 4A:
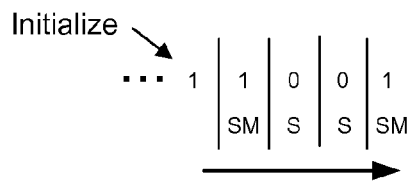
FIG. 4A illustrates an exponent, in which squaring and multiplication operations are performed according to each bit of the exponent.
Figure 4B:
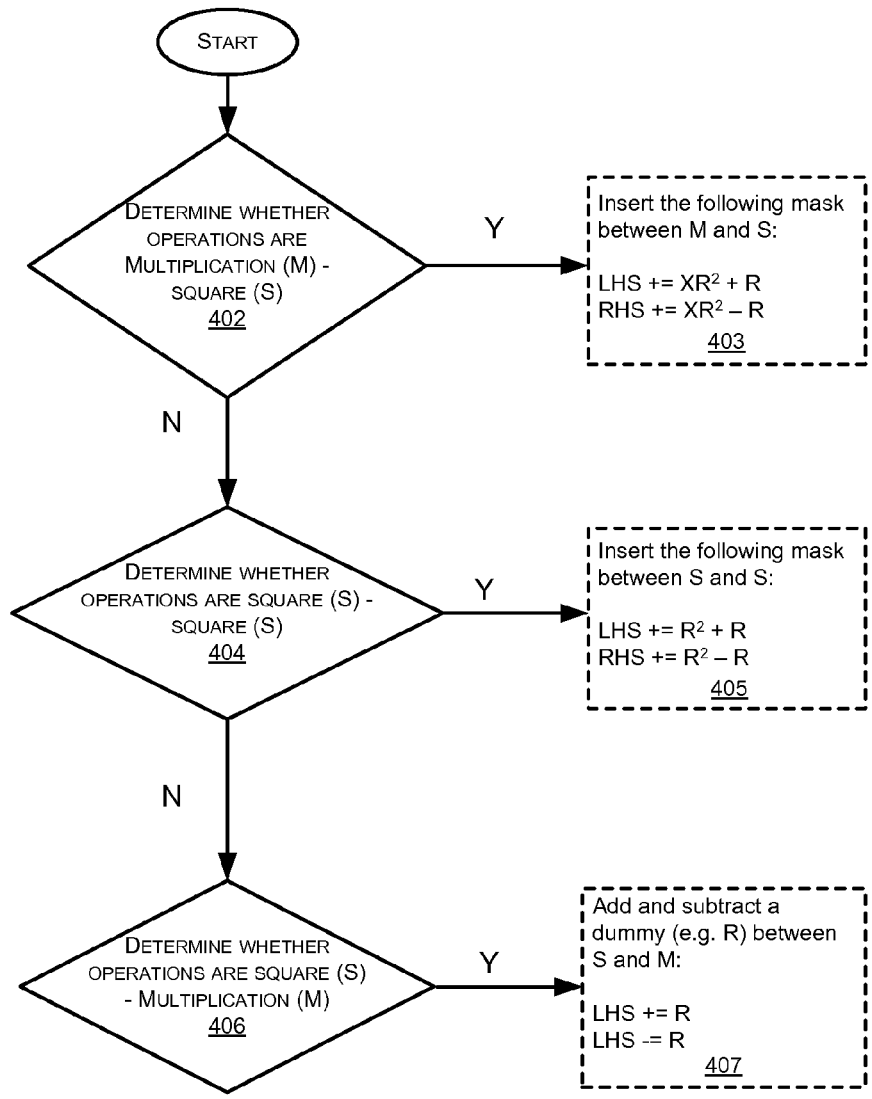
FIG. 4B is a flow chart illustrating an exemplary method for determining the execution of specific masking operations in the AMM based on the sequence of squaring and multiplication operations in an exponent.
Figure 4C:
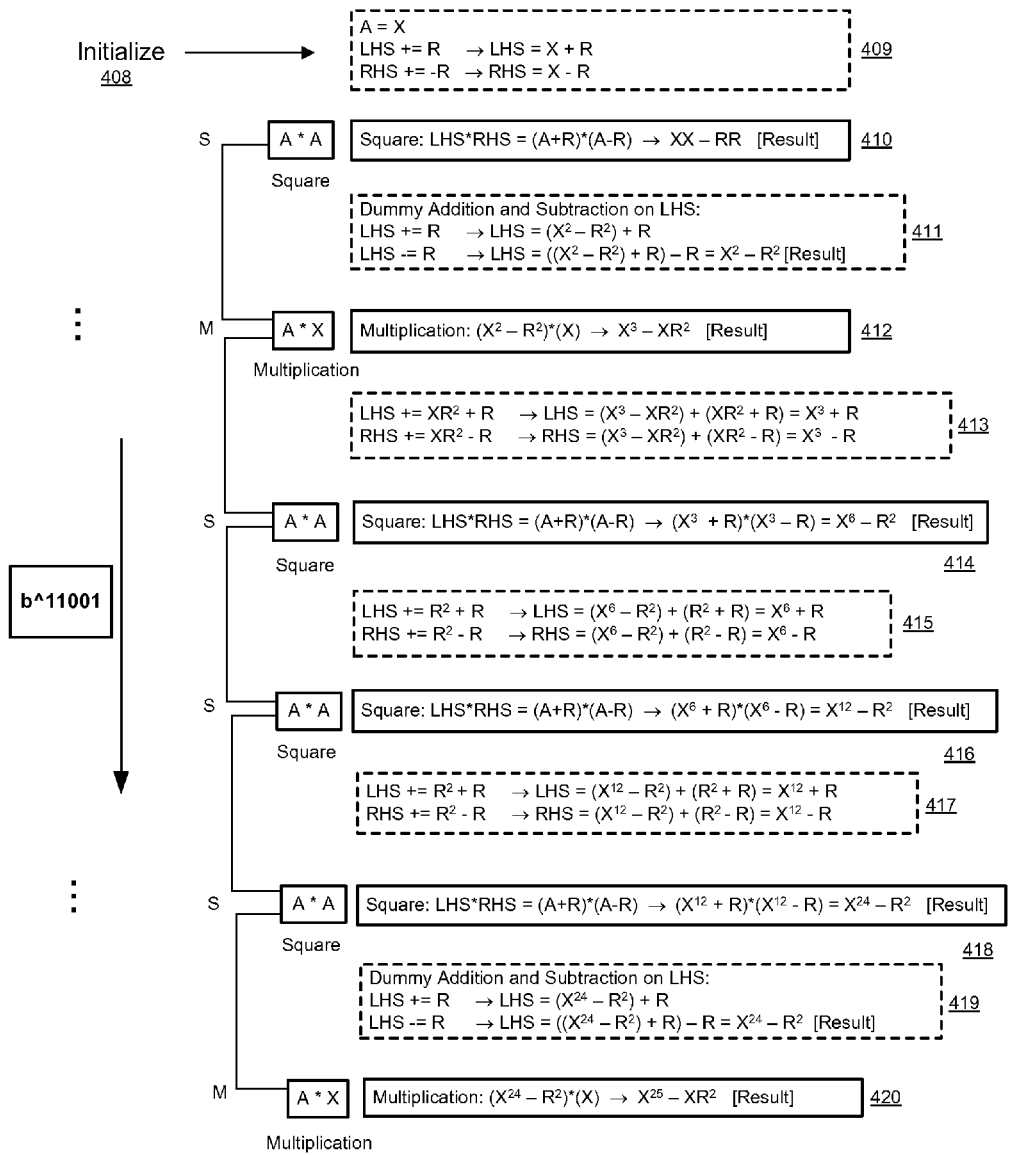
FIG. 4C illustrates in detail the steps when the method of FIG. 4B is applied to the exponent of FIG. 4A.

FIG. 4A illustrates an exponent, and a sequence of corresponding squaring and multiplication operations performed during a modular exponentiation routine. FIG. 4B shows a flowchart for preparing a sequence of masks (or indexes for selecting masks) for AMM based on the sequence of squaring and multiplication operations corresponding to an exponent. FIG. 4C illustrates in detail the steps when the method of FIG. 4B is applied to the exponent of FIG. 4A. To avoid SPA leaks, the process of encoding the exponent may be performed prior to the exponentiation process. Alternatively, it may be implemented during the exponentiation. The sequence of steps 402, 404, 406 may be performed in parallel rather than sequentially, to avoid timing/SPA leakage.

Referring to FIG. 4A, an exponent of a certain bit length is received. Initialization begins at the first and leftmost bit 1 in the exponent. Initialization may, for example, comprise assigning a value X to an input A. In some instances, X can be a value 1. In others, X may be the exponentiation base B or a pre-computed power of the exponentiation base B.

As shown in FIG. 4A, the exponent sequence 11001 can translate into the sequence of operations init||SMSSSM, in the simple left-to-right algorithm. A square operation and a multiplication operation (SM) are performed in the beginning after initialization, and also each time a bit 1 is encountered. Whenever a bit 0 is encountered along the exponent, one square operations (S) is performed. Based on the aforementioned combinations, the sequence of squaring and multiplication operations in the exponent 11001 of FIG. 4A will be as follows after initialization:

11001

SMSSSM

In the sequence SMSSSM, each S or M operation follows a previous S or M, and only SM, MS, or SS transitions are observed. (The exact transitions in SMSSSM are SM, MS, SS, SS, SS, and SM—coming from the pairs in bold: SMSSSM, SMSSSM, SMSSSM, SMSSSM, SMSSSM.) In a sequence of masked AMM squares and masked AMM multiplies, the mask and fix parameters can be set us so that the operation flows efficiently and the output of one masked operation can be used as the input of the next, and all masks can be precomputed and stored at the start of the exponentiation. As discussed above, a masked AMM with input mask 'A−R' yields output '$A^2$−R' i.e. using an identical mask. Further, a masked AMM multiply whose inputs are masked with 'A−R' and 'B−R' produces an output masked as 'A*B−R'. Again, the identical mask is preserved. As a result, two operations are defined in terms of a mask R that take masked inputs and produce masked outputs—all defined in terms of R. These can be chained together to produce an exponentiation that is masked from beginning to end. The transformation of squares into AMM squares renders them indistinguishable on average from true multiplies—however they are only indistinguishable if the sequence of add and subtract operations applied is also independent of whether the operations are squares or multiplies.

FIG. 4B is a flow chart illustrating the execution of specific masking operations in the AMM based on the specific sequence of squaring and multiplication operations in an exponent. Although actually following a decision tree such as this during a modular exponentiation is likely to produce data dependent power variations, the decision tree defines an encoding strategy that in some embodiments is implemented as a sequence of operations in constant time and with constant SPA features.

With reference to FIG. 4B, as the AMM proceeds along the length of the exponent from left to right, the method determines which masking steps to insert between consecutive two operations, based on whether the two operations are the pair SM, MS, or SS. In step 402, the method determines if two consecutive operations in the exponent consist of a multiplication operation and a square operation (i.e. MS). If the operations are MS, the following masking steps are performed between the multiplication (M) and the square (S), as shown in step 403:

$$LHS += X*R^2 + R$$

$$RHS += X*R^2 - R$$

X is the value that is assigned to an input (e.g. an input A) and R is the mask value.

In step 404, the method determines if the two consecutive operations are squares (i.e. SS). If the operations are SS in step 404, the following masking steps are performed between the consecutive squaring operations, as shown in step 405:

$$LHS += R^2 + R$$

$$RHS += R^2 - R$$

In step 406, the algorithm determines if the two consecutive operations in the exponent consist of a square operation and a multiplication operation (i.e. SM). If the operations are SM in step 406, the following steps are performed between the square (S) and the multiplication (M), as shown in step 407:

$$LHS += R$$

$$LHS -= R$$

In step 407, a dummy value is added and then subtracted between the square (S) and the multiplication (M). In the example shown above, the dummy value is designated as the mask value R. However, the dummy value can be any value, since step 407 is essentially a dummy addition and subtraction step.

FIG. 4C shows in detail the steps when the method of FIG. 4B is applied to the exponent of FIG. 4A. Specifically, FIG. 4C illustrates the execution of specific masking operations in the AMM based on the sequence of squaring and multiplication operations in the exponent of FIG. 4A. As shown in FIG. 4C, the squaring operations are converted into a series of multiplications and addition/subtraction steps, which effectively masks the squaring operations. The equations in FIG. 4C are based on C programming language syntax, whereby the result from a previous step forms the input A to a next step.

With reference to FIG. 4C, the accumulator A is first initialized in step 408, with the value X, according to the first bit of the exponent 11001 of FIG. 4A. The following calculations are performed on the LHS and RHS parameters, in step 409:

$$LHS += R \text{->} LHS = X + R$$

$$RHS += -R \text{->} RHS = X - R$$

Next, a squaring operation is performed in step 410, using the LHS and RHS parameters calculated in step 409:

Square: $LHS*RHS = (A+R)*(A-R) = (X+R)*(X-R) \text{->} X^2 - RR$ [Result]

In the example of FIG. 4C, the first and leftmost bit 1 corresponds to a square and multiplication (SM). As stated previously with reference to FIG. 4B, a dummy value is added and then subtracted between a square (S) and multiplication (M). Therefore, a dummy addition and subtraction step is performed on the result of step 410 in step 411, as shown below:

$$LHS += R \text{->} LHS = (X^2 - R^2) + R$$

$$LHS -= R \text{->} LHS = ((X^2 - R^2) + R) - R = X^2 - R^2 \text{ [Result]}$$

Next, a multiplication operation is performed in step 412, using the result from step 411.

Multiplication: $(X^2 - R^2)*(X) \text{->} X^3 - XR^2$ [Result]

As shown in FIG. 4C, the second bit is a 1, and corresponds to a multiplication and square (MS). As stated previously with reference to FIG. 4B, if the operations are MS, the following calculations are performed between the multiplication (M) and the square (S):

$$LHS += XR^2 + R$$

$$RHS += XR^2 - R$$

In step 413 of FIG. 4C, the above calculations are performed on the LHS and RHS parameters using the result of step 412 as shown:

$$LHS += XR^2 + R \text{->} LHS = (X^3 - XR^2) + (XR^2 + R) = X^3 + R$$

$$RHS += XR^2 - R \text{->} RHS = (X^3 - XR^2) + (XR^2 - R) = X^3 - R$$

Next, a square operation is performed in step 414 using the LHS and RHS parameters computed in step 413:

Square: $LHS*RHS = (A+R)*(A-R) \text{->} (X^3 + R)*(X^3 - R) = X^6 - R^2$ [Result]

In the example of FIG. 4C, the third bit of the exponent is a 0, and corresponds to two squares (SS). As stated previously with reference to FIG. 4B, if the operations are SS, the following calculations are performed between the consecutive squaring operations:

$$LHS += R^2 + R$$

$$RHS += R^2 - R$$

In step 415 of FIG. 4C, the above calculations are performed on the LHS and RHS parameters using the result of step 414 as shown:

$$LHS += R^2 + R \text{->} LHS = (X^6 - R^2) + (R^2 + R) = X^6 + R$$

$$RHS += R^2 - R \text{->} RHS = (X^6 - R^2) + (R^2 - R) = X^6 - R$$

Next, a square operation is performed in step 416 using the LHS and RHS parameters computed in step 415:

Square: $LHS \cdot RHS = (A+R)*(A-R) \text{->} (X^6 + R)*(X^6 - R) = X^{12} - R^2$ [Result]

In the example of FIG. 4C, the fourth bit is a 0, and corresponds to two squares (SS). Subsequently, the following calculations are performed in step 417 using the result from step 416:

$$LHS += R^2 + R \text{->} LHS = (X^{12} - R^2) + (R^2 + R) = X^{12} + R$$

$$RHS += R^2 - R \text{->} RHS = (X^{12} - R^2) + (R^2 - R) = X^{12} - R$$

Next, the square operation is performed in step 418 using the LHS and RHS parameters computed in step 417:

Square: $LHS*RHS = (A+R)*(A-R) \text{->} (X^{12} + R)*(X^{12} - R) = X^{24} - R^2$ [Result]

The last bit of the exponent in the example of FIG. 4C is a 1, and this corresponds to a square and multiplication (SM). Therefore, a dummy addition and subtraction step is performed on the result of step 418 in step 419, as shown below:

$$LHS += R \text{->} LHS = (X^{24} - R^2) + R$$

$$LHS -= R \text{->} LHS = ((X^{24} - R^2) + R) - R = X^{24} - R^2 \text{ [Result]}$$

As shown in FIG. 4C, a final multiplication operation is performed in step 420, using the result of step 419.

Multiplication: $(X^{24}-R^2)*(X)->X^{25}-XR^2$ [Result]

From the example of FIG. 4C, one can observe that all the squaring operations in the exponent have been converted into multiplications using AMM.

In some embodiments, AMM can be applied to an exponentiation that uses the sliding window algorithm. In these embodiments, the squares are masked by conversion into multiplications, and some of the original multiplications can also be masked, as described previously with reference to FIGS. 4B and 4C. A square remains a square in terms of where it fits into the exponentiation scheme. However, if a square is implemented as a multiplication, an attacker may mistake the square for a 1 or a 3 (eg. in an MSM sequence in the sliding window algorithm), and this may foil the attacker's decryption strategy.

In some embodiments, AMM can be applied to a small number of squares, and replaces these squares with true multiplications in which the result is not discarded (unlike a dummy multiplication where the result is discarded). Most of the remaining unmasked squares in these embodiments will continue to have optimized squares. An attacker may not be able to distinguish the masked squares from the unmasked squares using a clustering attack.

In another embodiment, AMM may be performed immediately after a multiplication, and this produces an MM sequence (two consecutive multiplications). The MM sequence typically does not occur in any of the standard exponentiation algorithms. Thus, the MM sequence can be used to confuse an attacker.

In a further embodiment, AMM may be used to produce a pattern that appears in the form SMSMSMSM, for example by converting the third S in the sequence SMSSSMS into an AMM . . . . This allows as many dummy or masked squares to be inserted into the sequence without creating an MM sequence. The symmetrical pattern may lead an attacker to believe that a binary algorithm is being employed. However, since many of the multiplications are in fact squares, the number of raw 'S' operations is shorter than what the attacker would expect in the binary exponentiation. As a result, the attacker has to be able to recognize the AMM operations and distinguish the masked squares from the true multiplies to decode the exponent.

Switching Mask Values Mid-Computation

Figure 5A:
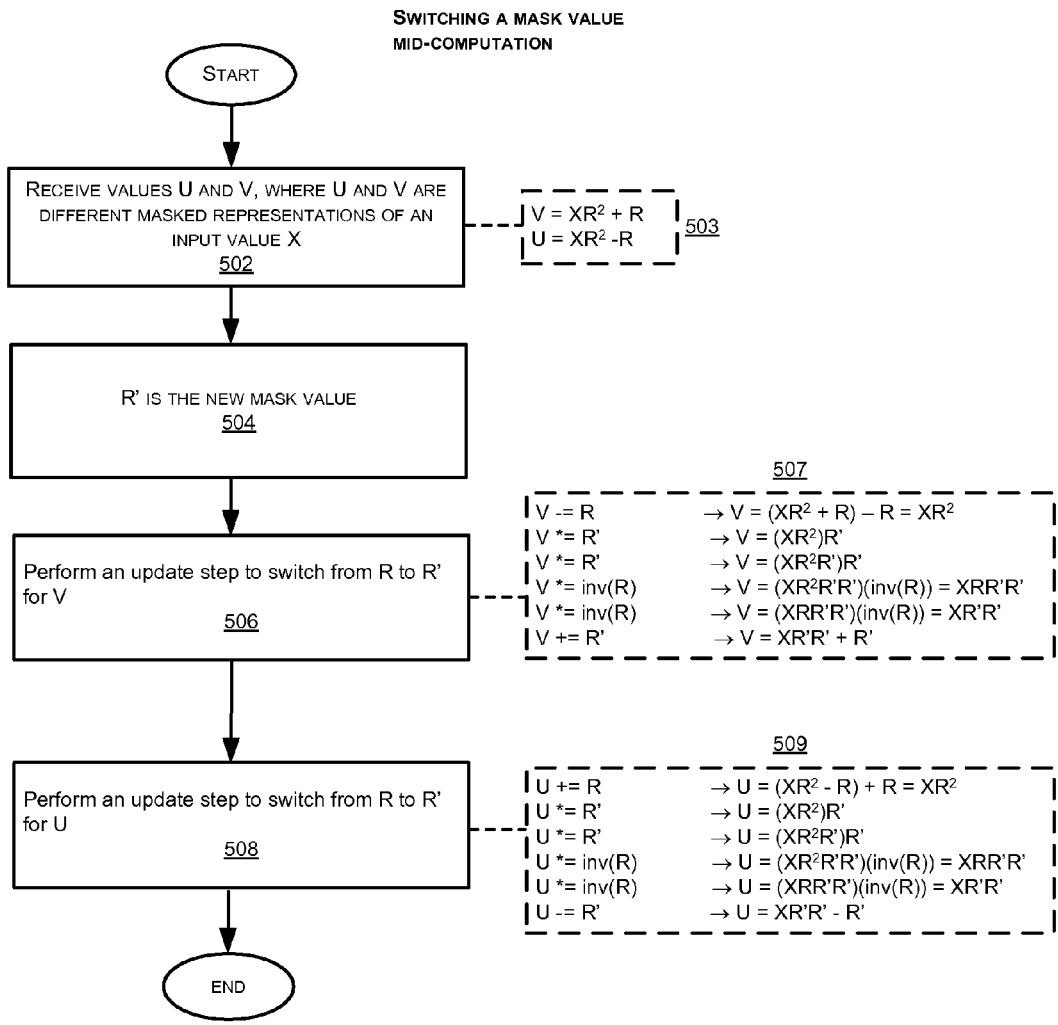
FIGS. 5A and 5B illustrate exemplary methods of switching a mask value in the middle of a computation when AMM is being performed on an exponent.
Figure 5B:
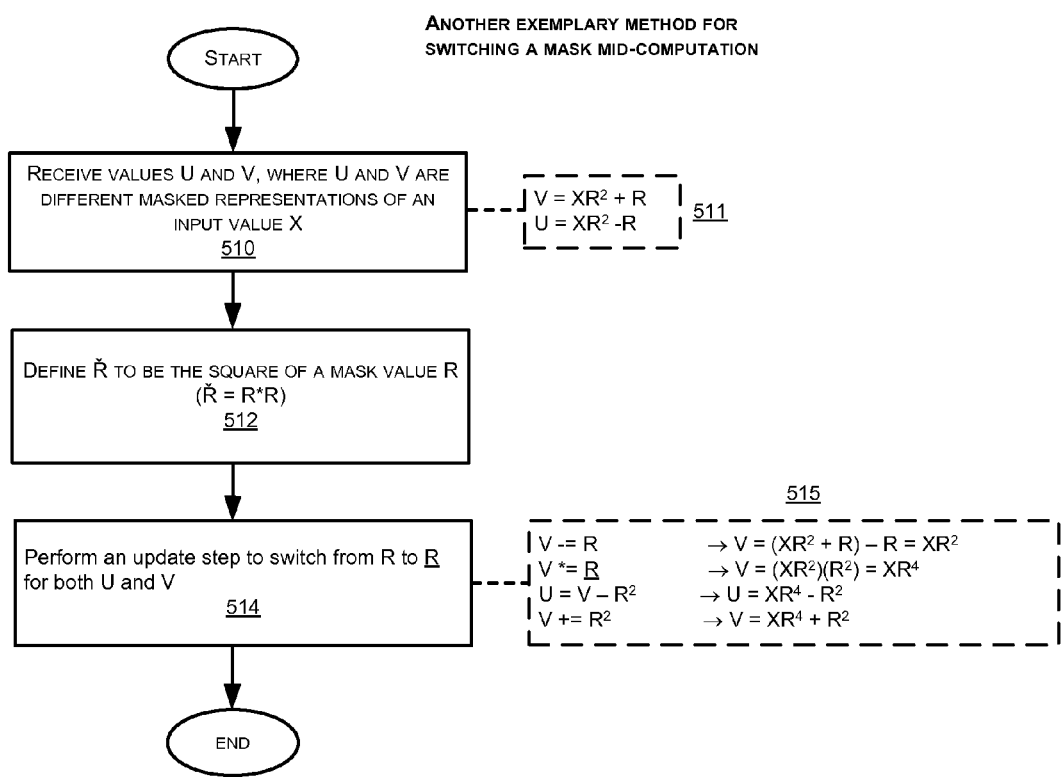

In some embodiments, additional multiplications are used during an exponentiation to change the value of a mask or blinding factor. These multiplications may provide resistance to SPA attacks that augments or compliments AMM squares. These multiplications may be used to update a cached AMM mask. They may also be used to update or change the value of a blinding factor that is masking the exponentiation base. Additionally this technique may be used to provide resistance to higher order DPA attacks. In the background art, when a blinding factor is applied to the base at the beginning of a modular exponentiation (or prior to it), the blinded value becomes the base for future multiplications (and, with cache-based methods such as k-ary and sliding window algorithms, for entries in a cache). But cross correlation attacks may identify sets (clusters) of multiplications that all use the same, blinded multiplicand. Using multiplications by a re-blinding factor to update a cached base (or all cached multiples of a base) can double the number of clusters an attacker must identify in a cross-correlation attack. Some embodiments of this invention also store the blinded value of 1 in a table of cached powers (corresponding to the exponent bit 0, or k 0s). When all entries in the cache are masked with a same blinding factor, then the inverse factor (the "unblinding" value) may be calculated without requiring knowledge of high-level secrets like the exponent value. Embodiments of this invention can render cross correlation attacks harder, and achieve partial resistance against DPA attacks (in addition to the primary SPA resistance for squares and multiplications). FIGS. 5A and 5B illustrate exemplary methods for switching a mask value in the middle of a computation when AMM is being performed in exponentiation.

In the method of FIG. 5A, R' is a new mask value. To switch from R to R', the inverse of R needs to be computed, and the input value multiplied with R'. The inverse of R may be determined by calculating the multiplicative inverse of R within the group being used for the multiplications (e.g. the group modulo P).

Depending on which modular exponentiation routine is being used, each entry X in the cache (corresponding to a power of the base) is stored in some embodiments using two values (for example, U and V). Having two masked values for each base may result in a large number of pre-computed bases, which can increase memory requirements for the system. For example, in a sliding window with 16 entries (or more commonly 32 or 64 entries), twice as many registers may be used to store U and V masked representation of the table. The values of R and its inverse may pre-computed and stored, along with the table. When updating the mask, in the example of FIG. 5A, a new mask value R' and the inverse mask value (inverse of R) must be computed for the group—but these values (particularly the inverse of R) can be computed once during the update process and reused when updating all entries in the cache. Note that the method of maintaining separate U and V values is entirely optional, as the value of U can be calculated from V by adding in twice the value of R—and that some embodiments of the invention do not store U in the cache, and perform updates only on V As shown in FIG. 5A, values U and V are received in step 502, where the values U and V are different masked representations of an input value X. Assuming the operations in the example of FIG. 5A take place between a multiplication and a square (MS) in which the outputs are masked as in FIG. 4.C, then U and V will be designated as shown in step 503:

$V=XR^2+R$ $U=XR^2-R$

Next, the inverse of R is calculated (or retrieved) in step 504.

In step 506, an update step is performed mid-computation to switch the mask value from R to R' for the value V. The details of the update step 506 are shown in the series of calculations 507 of FIG. 5A:

$V-=R->V=(XR^2+R)-R=XR^2$ $V*=R'->V=(XR^2)R'$ $V*=R'->V=(XR^2R')R'$ $V*=\mathrm{inv}(R)->V=(XR^2R'R')(\mathrm{inv}(R))=XRR'R'$ $V*=\mathrm{inv}(R)->V=(XRR'R')(\mathrm{inv}(R))=XR'R'$ $V+=R'->V=XR'R'+R'$ Similarly, in step 508, an update step is performed mid-computation to switch the mask value from R to R' for the value U. The details of the update step 508 are shown in the series of calculations 509 of FIG. 5A as follows:

$$U+=R \to U=(XR^2-R)+R=XR^2$$

$$U*=R' \to U=(XR^2)R'$$

$$U*=R' \to U=(XR^2R')R'$$

$$U*=\text{inv}(R) \to U=(XR^2R'R')(\text{inv}(R))=XRR'R'$$

$$U*=\text{inv}(R) \to U=(XRR'R')(\text{inv}(R))=XR'R'$$

$$U-=R' \to U=XR'R'-R'$$

In FIG. 5A, the update step to switch from R to R' comprises the series of multiplication and addition/subtraction steps as shown, which can either be performed in a single memory location (cache entry) or in multiple memory locations (cache entries). After the update step 506 is completed, the masked value $V=X\,R^2+R$ is transformed into $V=XR'R'+R'$ mid-computation, where R' is the new mask value. Similarly, the masked value $U=X\,R^2-R$ undergoes the update step 508 to transform to $U=XR'R'-R'$ mid-computation.

FIG. 5B illustrates another exemplary method of generating a new mask value without requiring computation of the inverse of the original mask value. The exemplary method in FIG. 5B may be more efficient than the method in FIG. 5A, because the modular multiplicative inverse of R modulo base (P) does not have to be computed in the example of FIG. 5B. Instead, the new mask value R̂ is simply defined as the square of R. In addition, the input U is updated together with V in the method of FIG. 5B, without requiring additional multiplications. (This example is an alternative to the method of FIG. 5B in which separate multiplications are used when updating U.)

As shown in FIG. 5B, values U and V are received in step 510, where the values U and V are different masked representations of an input value X. Assuming the operations in the example of FIG. 5B take place between a multiplication and a square (MS), then U and V will be designated as shown in step 511:

$$V=XR^2+R$$

$$U=XR^2-R$$

Next, the new mask value R̂ is defined as the square of the original mask value R:

$$\hat{R}=R^2$$

In step 514, an update step is performed mid-computation to switch the mask value from R to R̂ for the values U and V. The details of the update step 514 are shown in the series of calculations 515 of FIG. 5B as follows:

$$V-=R \to V=(XR^2+R)-R=XR^2$$

$$V*=\hat{R} \to V=(XR^2)(R^2)=XR^4$$

$$U=V-R^2 \to U=XR^4-R^2$$

$$V+=R^2 \to V=XR^4+R^2$$

In contrast to the method of FIG. 5A, the method of FIG. 5B requires fewer number of computational steps and does not require calculation of the inverse mask value. Therefore, the method of FIG. 5B is computationally more efficient than the method of FIG. 5A, and also requires fewer memory registers.

Switching LHS and RHS Parameters to Increase Number of Clusters

Figure 6A:
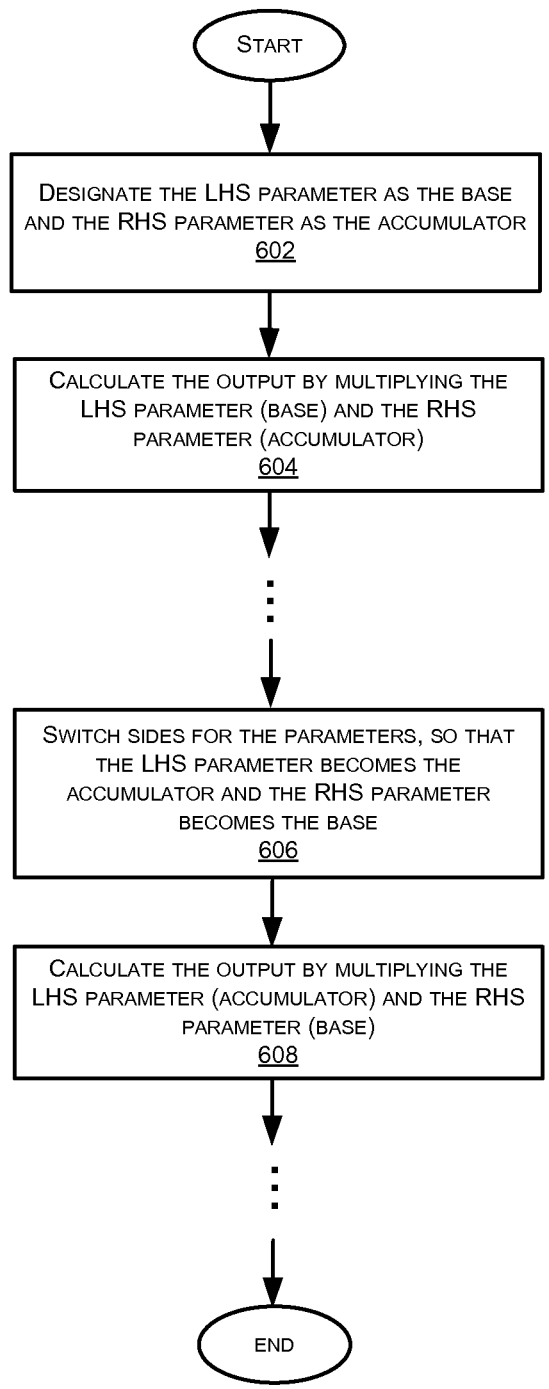
FIGS. 6A and 6B illustrate exemplary methods of countering clustering attacks.

FIG. 6A illustrates an exemplary method of countering clustering attacks. Specifically, the method of FIG. 6A switches the LHS and RHS parameters to increase the number of clusters to counter against clustering attacks. Some embodiments of the invention employ hardware multiplication circuitry in which the LHS and RHS parameters are handled through different circuit paths, and where side channel leakage may reveal a different pattern of variations depending on whether an input is on the left hand side or the right hand side. In some embodiments, the method of FIG. 6A can be used in conjunction with any of the exemplary methods described with reference to FIGS. 2A-B, 3A-B, 4A-C, and 5A-B. When employing LHS and RHS swapping together with AMM squares, many embodiments perform the asymmetric masking first and the LHS-RHS assignment second, as swapping the elements has less benefit when the inputs are identical.

In step 602 of FIG. 6A, the LHS parameter is designated as the base, and the RHS parameter is designated as the accumulator. The output is then calculated by multiplying the LHS parameter (base) and the RHS parameter (accumulator) in step 604. It is noted that in typical multiplications in a modular exponentiation, the exponentiation intermediate (which may be called the "accumulator") is multiplied by a value which may be the exponentiation base or a table entry corresponding to a precomputed power of base (or one). In modular exponentiation, the exponentiation intermediate would be loaded into the side designated as the accumulator, and the table entry (base or power of the base) would be loaded into the side designated as the base.

Instead of always having an input A on the LHS (the accumulator) and the base on the RHS, both sides (LHS and RHS) may be switched during computation, such that the RHS becomes the accumulator and the LHS becomes the base (as shown in step 606 of FIG. 6A). The output is then calculated by multiplying the switched LHS and RHS parameters (step 608). As shown in step 608, the output is now the product of the LHS parameter (accumulator) and the RHS parameter (base). Subsequent operations after the switch will be based on the switched LHS and RHS parameters.

As shown in FIG. 6A, the assignment of the accumulator and the multiplicand (base) parameters to the LHS and RHS of the multiplication circuit can be switched during computation. For example, at the start of each multiplication, inputs could be assigned to the LHS or RHS at random. Alternatively, in some embodiments, the inputs are assigned to LHS and RHS by a predetermined non-random sequence. This may render cross-correlation (clustering) attacks more difficult. Instead of having only one cluster pertaining to input X, a new cluster relating to another input X' is created when the LHS and RHS parameters are switched. The squaring and multiplication operations will appear differently in the power traces between these two clusters, and this can provide resistance against high-order DPA attacks.

In some embodiments, the switching of the LHS and RHS parameters can continue throughout the computation at either fixed or random intervals. Even though there will be only two clusters regardless of the number of times the sides are switched, an attacker will still have to determine which operations fall into which cluster, in order to successfully perform a clustering attack.

Negation of Parameters to Increase Number of Clusters

Figure 6B:
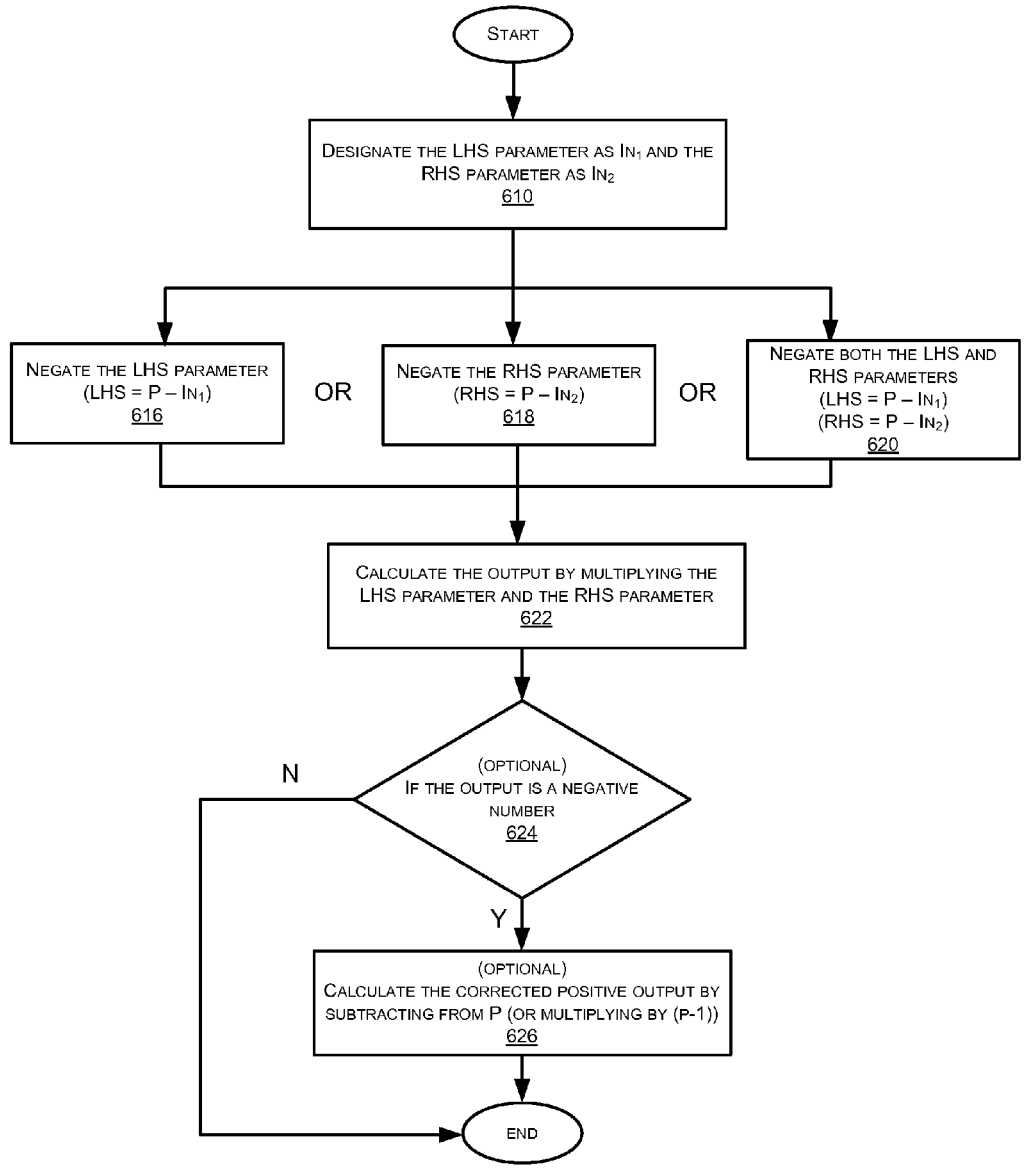

FIG. 6B illustrates another exemplary method of countering the clustering attacks described above. Specifically, the method of FIG. 6B employs the negation of one or more input parameters to increase the number of clusters for resistance against clustering attacks. Some embodiments of the invention employ multiplication circuitry in which a value P–X can be validly represented and is different from X, and where multiplication by X'=P–X reveals different leakage in a side channel than multiplication by X. In some embodiments, the negating method of FIG. 6B is used in conjunction with the switching method of FIG. 6A to further increase the number of clusters. In some embodiments, the method of FIG. 6B are used in conjunction with one or more of the exemplary methods described with reference to FIGS. 2A-B, 3A-B, 4A-C, and 5A-B. The negating method of FIG. 6B may be used when the operation is a square ($ln_1$ equals $ln_2$) or a multiply ($ln_1$ does not equal $ln_2$). It is noted that when employing the method of FIG. 6B with a square to negate one and only one of the input parameters, the result is a multiplication in which the LHS and RHS parameters are not identical, which although it is not masked, may provide some of the benefits against SPA attacks that the AMM squares provide.

In the method of FIG. 6B, negating a number is a modular operation and is performed by subtracting the number from the input prime P. An output number that is a negative number can be negated again to obtain a corrected positive output value. For example, if the output is negative, the output can be subtracted from P to obtain the correct output. In some embodiments, the value is multiplied by negative 1 to obtain the positive output.

In step 610 of FIG. 6B, the LHS parameter is designated as $ln_1$ and the RHS parameter designated as $ln_2$. The output is calculated by multiplying the LHS parameter and the RHS parameter in step 612.

Next, one or more parameters are negated (step 614). In one multiplication, the LHS parameter is negated (step 616), and is given by:

$$LHS = P - ln_1$$

In a different multiplication employed within the same modular exponentiation, the RHS parameter is negated (step 618), and is given by:

$$RHS = P - ln_2$$

In some embodiments of the invention, at yet another multiplication within the same modular exponentiation, both the LHS and RHS parameters are negated (step 620), and are given by:

$$LHS = P - ln_1$$

$$RHS = P - ln_2$$

After the negating step, the output is calculated by multiplying the LHS and RHS parameters (step 622). If only one of the LHS or RHS parameters has been negated (e.g. step 616 or step 618), the output is a negative number. The output is a positive number when both the LHS and RHS parameters have been negated (step 620), and it is also positive in multiplications where neither the LHS nor RHS parameter was negated.

Depending on the total number of negations in the multiplication, an end result may be negative or positive. At step 624, it may be determined whether the calculated output of step 622 is a positive number or a negative number. In the optional step 626, if the output is a negative number, the corrected positive output is calculated. In some embodiments this is performed by subtracting the output from P. In some embodiments the output may be negated by multiplying it by a negative number (e.g. –1, or P–1) to obtain a positive number (step 626). If the output is not a negative number (i.e. the output is positive), the output is of the correct polarity and there is no need to negate it. When the output of the operation (or a descendant output) becomes the input to a squaring operation—as is often the case in embodiments that are implementing part of a modular exponentiation—then it is not necessary to make the sign positive. The result of the subsequent square will be positive regardless of whether the sign of its input was positive or negative. Correcting the sign is only necessary when no further squarings will be performed on the value during the exponentiation.

Thus, the LHS and RHS parameters can be negated in a number of ways using the method of FIG. 6B to produce more clusters, as shown in the following four quadrants:

| | |
|---|---|
| LHS = $In_1$ | LHS = P-$In_1$ |
| RHS = $In_2$ | RHS = $In_2$ |
| LHS = $In_1$ | LHS = P-$In_1$ |
| RHS = P-$In_2$ | RHS = P-$In_2$ |

In some architectures, the above four quadrants may appear as two different clusters because leakage may either be dominated by the LHS or the RHS. In situations where this is anticipated, some embodiments employ only two of the four quadrants. Two-quadrant embodiments that use quadrants on a diagonal (i.e. the "+,+ and –,–" or "+,– and –,+") will obtain two clusters regardless of whether the leakage is dominated by the LHS or the RHS parameter. As noted above, when applied to a square (i.e. where $ln_1$ equals $ln_2$), a two-quadrant embodiment that uses only the "–,+ and +,–" cases results in squares in which the LHS and RHS parameters are not identical and thus the side channel leakage from the multiplier may appear different from a square in many embodiments.

As stated previously, increasing the number of clusters (such as doubling or quadrupling the number of clusters) in a clustering problem provides greater resistance against a cross-correlation and other clustering high order attacks. In addition, performing subtraction steps to render numbers negative is a method which complements AMM, because AMM also contains many addition and subtraction steps. As a result, it may be difficult for an attacker to keep track of which step is an addition or subtraction contributing to AMM, and one that is implementing randomized negation.

It is noted that in some instances, an attacker may be able to detect dummy additions and subtractions (such as in step 419 of FIG. 4C) due to small timing differences in the power traces. However, negating an operand is an actual subtraction, not a dummy subtraction. Thus, negative numbers provide another level of security by incorporating a different type of subtraction relative to dummy subtractions.

In some embodiments, the negation of parameters is performed randomly. In other embodiments, the negation of parameters is be performed on a regular schedule (for example, every other multiplication is made negative, and the result of the final multiplication is always positive).

As stated previously, in some embodiments, the negating method of FIG. 6B is used in conjunction with the switching method of FIG. 6A to further increase the number of clusters. In these embodiments, switching the LHS and RHS parameters doubles the number of clusters, and adding in negations doubles the number again. This can quadruple the number of clusters, leading to a significant increase in the number of clusters in the clustering problem that an attacker has to solve.

In some embodiments, the negating method and switching method are used in conjunction with AMM, and this provides a countermeasure that is complementary to Joint Message and Exponent Blinding (JMEB), which is discussed in further detail below.

Figure 6C:
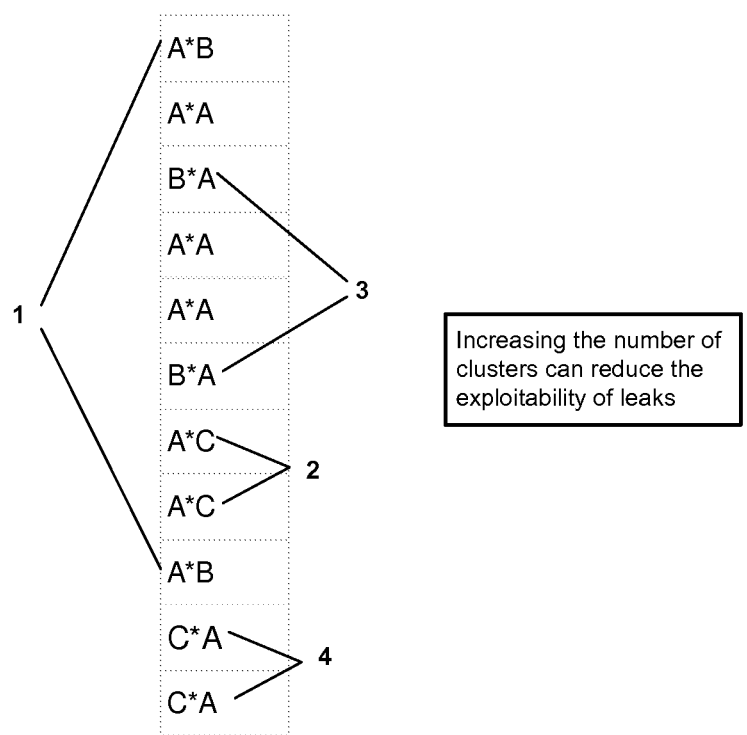
FIG. 6C shows an example whereby increasing the number of clusters can reduce the exploitability of leaks.

FIG. 6C shows an example whereby switching parameters from the left side to the right side can be effective in breaking correlations, because the switching increases the number of clusters that an attacker has to decode.

As noted previously, it may be difficult for an attacker to exploit the correlation in the L-R relationship. Even if the attacker has determined all the entries in cluster A and which clusters (e.g. B, C, and D) the other entries fall into, the attacker may still have difficulty determining which cluster is a prime (A', B', C', and D') when the parameters have been switched.

In a cluster comprising entries A*B's and A*A's where the B's are always on the right hand side, if an attacker performs a cross correlation attack on the cluster, the attacker may succeed because the entries in the cluster have an R-R correlation. However, switching half of the entries in the cluster to the left hand side will form a new cluster L-L, and result in two clusters. An attacker may be able to determine which entries are in the L-L cluster if the attacker performs a sufficient number of power traces. However, it may require many more traces for the attacker to determine the R-L correlation between the entries in the two clusters, particularly if the entries are part of a same family.

The decoding problem increases in difficulty when the entries include multipliers by A*C. Similarly, the entries A*C and C*A can have either R-R or L-L correlations.

In some embodiments, using a loop structure that masks intermediates can increase the number of clusters and reduce the exploitability of leaks.

FIG. 6C illustrates a hypothetical case in which there are four clusters (1, 2, 3, 4), and where entries A*B belong to cluster 1, entries A*C belong to cluster 2, B*A belong to cluster 3, and C*A belong to cluster 4. To solve for the exponent, an attacker has to determine to which cluster the respective entries belong. As shown in FIG. 6C, one way to reduce the exploitability of leaks is to switch the parameters from the right hand side to the left hand side. The switching increases the number of clusters, and possibly reduces the exploitability of leaks.

It is noted that certain word-oriented multiplication architectures run detectably faster if one of word of an input operand is zero. However, because the L and R parameters are processed differently, the leakage rates for those two parameters are likely to be different. For example, suppose the leakage function H(LHS,RHS) reveals information about the input operands in a multiplication, and suppose that H(LHS,RHS,OUT) can be expressed entirely as the concatenation of an $H_1$(LHS) that leaks only information about LHS, with an $H_2$(RHS) that leaks only information about RHS, and a function $H_3$(OUT) that leaks information about the output. Consider the case where the leakage function $H_1$(LHS) reveals the highest order bit of each word of LHS, in a 32-word representation; and consider the case where the leakage function $H_2$(RHS) reveals, for each byte of RHS, whether that byte is zero. In this example, $H_1$(LHS) reveals 32 bits of information about LHS, while the amount of information that $H_2$(RHS) reveals about RHS is variable, depends on the value of RHS, and potentially reveals the entire value of RHS (e.g. in the case where RHS=0). Thus, 32 bits of information about LHS and some information about RHS can be obtained.

Because more information relating to one side may be obtained compared to the other (e.g. more bits of information may be obtained about LHS than RHS), it is commonly observed that one of the leakage functions (either LHS-LHS or RHS-RHS) can leak more than the other. For example, the leakage function on the LHS-LHS side may leak more than the leakage function on the RHS-RHS side, or vice versa. This can translate to one of the leakage functions requiring, e.g., ~10,000 operations to determine whether two sets of multiplications belong to the same cluster, whereas given the other leakage function it may only require, e.g., 100~1,000 operations to make the same determination. On the other hand, resolving a LHS-RHS relationship can require many more, e.g., a million operations, since the information leaked about the LHS and RHS parameters is different, which makes it harder to determine whether they are identical. In addition, a third type of cross-correlation attack requires detecting whether the output of one operation is the input to a subsequent operation. In general, $H_3$(OUT) is quite different from $H_1$( ) and $H_2$( ), and this similarly makes testing for identity difficult. Resolving a relationship in which the output of one operation is the input to a subsequent operation can require millions of operations to determine, because of the even lower degree of similarity between those functions. It is thus observed that the leakage rates are different for each leakage function, and that the amount of information that's useful in detecting similarity depends not only on the leakage rates but on the structure of the relationship between leakage functions.

In a modular exponentiation example in which all multiplications by a cached power of the base (the multiplicand) place that multiplicand on the right hand side, the primarily R-R correlations that will be useful to identify the clusters. On the other hand, if the same circuit were used to implement this modular exponentiation, but the multiplicands are always placed into the left hand side, then L-L correlations must be exploited to solve the clustering problem. In general, because the $H_1$( ) and $H_2$( ) are different leakage functions, one of these problems is likely to be harder to solve than the other. A designer may not know in advance which correlation is easier to exploit. Employing the countermeasures of FIG. 6A and FIG. 6B requires the attacker to solve some clusters of each kind—and regardless of which clustering problem is harder to solve, roughly half of the multiplications will be part of a "harder" clustering problem.

For example, if a manufacturer produces a smart card with all L-L correlations and another smart card with all R-R correlations, it may be easier to hack into one card than the other because of the difference in leakage between the two cards. The reason behind one card leaking more than the other is because the parameters are computed in different ways by the circuit. The designer, however, does not know in advance how the circuit computes the parameters and which card has more leakage. Furthermore, it is difficult to design both cards (one with L-L correlations and the other with R-R correlations) to leak exactly the same amount. Therefore employing a mixture of L-L and L-R clusters is likely to leave an attacker with a number of hard clusters to detect—and will reduce the number of examples in each cluster.

As stated previously, one countermeasure is to increase the number of clusters by switching the parameters. For example, if one cluster comprises entries with L-L relationships and another cluster comprises entries with R-R relationships, and the R-R relationships are more difficult to decode than L-L relationships, the security of the system will depend largely on the entries having the R-R relationships, and on the difficulty of mapping L's to R's in the entries having L-R relationships.

Thus, in the types of clustering problems described above, a close-to-secure implementation may be obtained when an attacker is not able to determine half of the entries in the clusters after the entries have been switched from the right hand side to the left hand side (increases the number of clusters). In addition, negating half of the parameters (e.g. the L-L cluster) can further split the clusters into more clusters. For example, assuming that the L-L clusters have very high leakage and the L-L clusters have been split into an L-L positive cluster and an L-L negative cluster, an attacker may be unable to determine that the L-L positive cluster and the L-L negative cluster in fact belong to the same original L-L cluster. As the result, the attacker may be unable to merge the two clusters (L-L positive and L-L negative) into one cluster.

When designing the card, system designers often consider ways to mitigate the leakage rate between clusters. They typically attempt to eliminate all leakage—or as much as is cost-effective to eliminate. But some leakage may get through, and embodiments of this invention employ a combination of multiplication hardware with control circuitry or software for supplying inputs to the multiplication hardware in a way that partially mitigates leakages. In practice, the leakage rate is usually not the same in L-L and R-R clusters. As a result, one often has to rely on the more secure side (L or R) to protect the system.

In summary, switching the parameters from the right hand side to the left hand side and negating the clusters can increase the number of clusters and reduce the exploitability of leaks.

Masking Intermediate Values

Masking of intermediate values in modular exponentiation can prevent DPA attacks. For example, in typical blinded modular exponentiation, an input can be effectively masked and randomized when the input is multiplied by a mask (or blinding factor) that is unknown to the attacker. The masked and randomized input can later be unmasked (unblinded) at the end of the operation. As mentioned previously, one common way of doing this (for exponentiation with for example the RSA decryption) is to compute the decryption of a C (i.e. $M=C^D \mod N$) using a mask value U by finding ($B=1/U^E \mod N$), letting $C'=C*B \mod N$, computing $T=(C')^D \mod N$, and finally $M=(T*U) \mod N$. In that previous example, the blinding factor B and unblinding factor U can be computed prior to an exponentiation (cached), and the relationship between blinding factor and unblinding factors depends on N and the encryption exponent E. Because the blinding factor is applied once and not changed during the exponentiation, many multiplications during the exponentiation may take place using a shared value—a power of C'—a fact that may be detectable with a cross correlation (clustering) attack. This section describes embodiments that use additional multiplications during an exponentiation loop in a way that changes a masked or blinded value, and thereby provides resistance to high-order DPA attacks. In some embodiments, the value of 1 stored in a cache is multiplied by a blinding factor X (which may be the same as an input blinding factor B, or may be different). Multiplications involving the masked representation of 1 are really influencing the value in the accumulator (i.e. are not dummy multiplications). These multiplications also provide a major benefit against SPA, as the output of the modular exponentiation step (prior to an unmasking step) the product of a power (D) of the input base and a power (Alpha) of X—but the two powers may not be identical. The unmasking parameter now depends on the power Alpha. In some embodiments, as will be seen below, other entries in a cache are also masked by X, and as a result the exponent Alpha is a function of the structure of the loop and is independent of D.

Figure 1F:
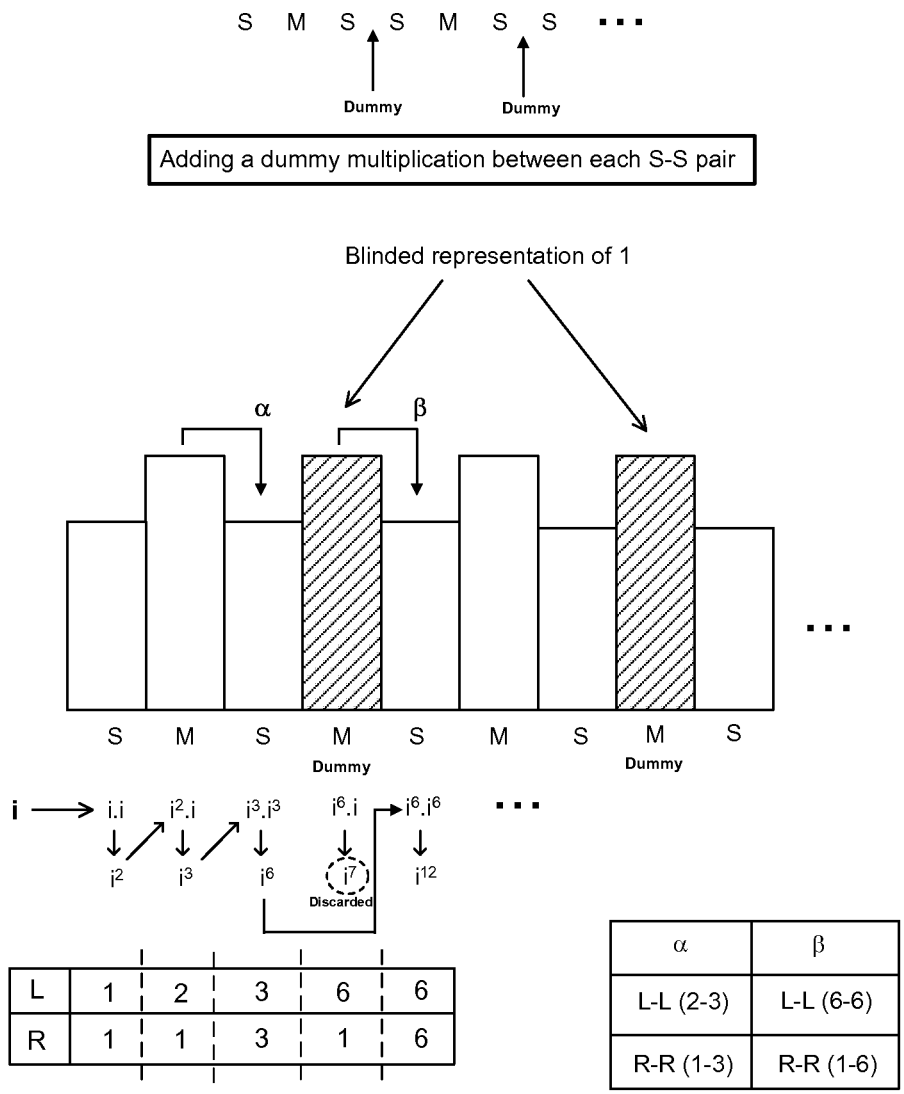
FIG. 1F shows an exponentiation using the k-ary square-and-multiply-always algorithm, where the system is vulnerable to a doubling attack.
Figure 7A:
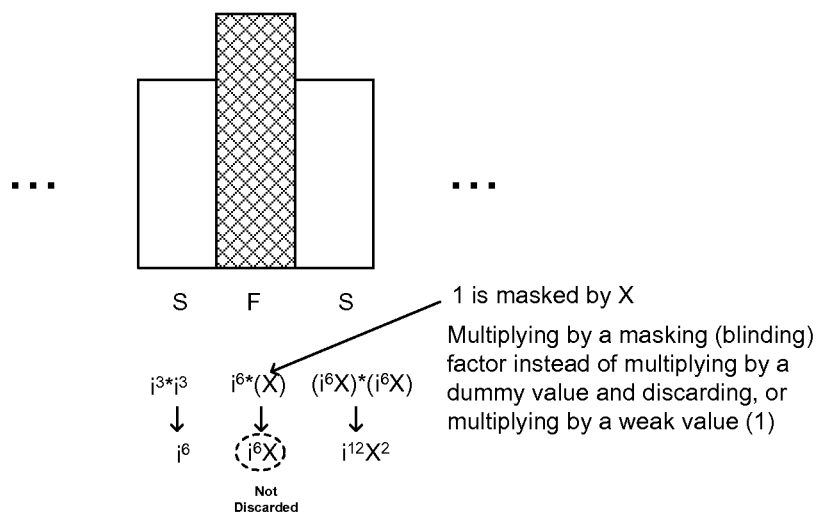
FIG. 7A shows different types of dummy multiplications, which can be randomized in an exponent.

As shown in FIG. 7A, F is a blinded representation of 1 using a masking parameter X, where the operation yields an output $i^6*(X)$ that is the product of a power of the base with a power of the mask. The result of this multiplication is stored in the accumulator and becomes an input to subsequent squares (and multiplies), in contrast to the exponent value of 7 (given by $i^6*i^1$) as shown in FIG. 1F. At each subsequent stage in the example of FIG. 7 A, the accumulator continues to hold a value that can be expressed as a product of the base (i) raised to some power (which is a prefix of D) with the mask (X) raised a different power (which is a prefix of Alpha). Bits of the exponent Alpha are nonzero at least in cases where the corresponding window of bits in D are zero. The masked computation of FIG. 7 A can be contrasted to the example of FIG. 1F, where a multiplication output is discarded, and a next operation (after the dummy multiply) uses the output of the previous operation (prior to the dummy). As shown in FIG. 7A, the dummy multiplications are replaced with multiplications by a mask. By replacing the dummy multiplications with masking operations, the dummy multiplications are no longer discarded. This can further foil cross correlation attacks that rely on determining the cross correlation between discarded and non-discarded results during computation.

Figures 7B, 7C:
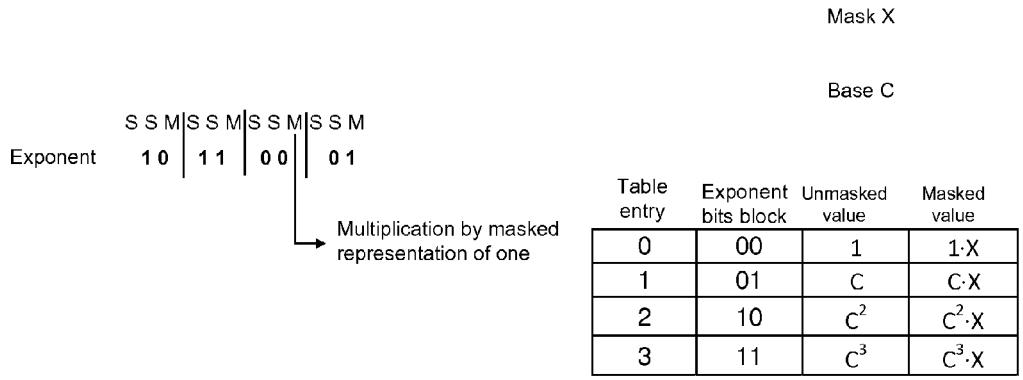
FIG. 7B shows a blinded representation using a masking parameter, where the dummy multiplications are replaced with re-masking operations.
FIG. 7C illustrates an exemplary embodiment of a countermeasure to the doubling attack in which a base is multiplied by a mask that can be extended to all the bits of the exponent.

FIG. 7B illustrates an exemplary embodiment in which all entries in a cache are masked. In this example, the same mask value (X, i.e. $X^1$) is applied to each entry in the cache. As a result, each multiplication by an entry in the cache contributes the same power of X into the accumulator—and the power Alpha is therefore independent of D. (Alpha may depend on the length of D—or more precisely, on the number of iterations used for the exponentiation loop—but does not depend on the sequence of particular bits in D.)

FIG. 7B shows a mask X, base C, a table with four entries (corresponding to a two-bit window), and an exemplary exponent 10110001. As shown in the table of FIG. 7B, for the unmasked multiplications, multiplication by entry 0 (corresponding to the block of exponent bits 00) corresponds to multiplying by 1 ($C^0=1$); multiplication by entry 1 (block of exponent bits 01) corresponds to multiplying by $C^1$ (i.e. C); multiplication by entry 2 (block of bits 10) corresponds to multiplying by $C^2$; and multiplication by entry 3 (bits 11) corresponds to multiplying by $C^3$.

After masking with X, the entry 0 may be as different from entry 1, 2, or 3 as entries 1, 2, and 3 are from each other. However if an attacker submits the ciphertext C=0, and if $C^0$ is treated as identically equal to 1, this may create a situation in which some embodiments hold X in entry 0, but 0 in entries 1, 2, and 3 when C is zero. Performing an exponentiation using such a table may reveal information about the exponent. But in fact, in math the value 0 raised to the 0 is an "indeterminate form" (i.e. is not equal to 1). Some embodiments handle this special case by returning 0 when C=0, without bothering to crank through the exponentiation. Some other embodiments load 0 into all table entries when C=0. Still others may throw an exception. (Some embodiments do not include special circuitry for detecting whether the value C equals zero, or for handling it differently.) (This paragraph is not meant to be an exhaustive list of the components or methods that embodiments may or may not include for detecting and handling the special case of C=0.)

In the example of FIG. 7B, the table entries are masked by multiplying with the value X, to produce 1*X, C*X, $C^2$*X, and $C^3$*X. (Multiplication here and throughout the application refers to multiplication in a group—often the group modulo a composite N or prime P or Q. As a result, the size of the representation of each entry in this table may be the same as the size of C, represented in this group.) As a result, when this table is used for a k-ary square-and-multiply-always exponentiation (where multiplications by entry 00 are used, rather than with discards), each multiplication by a power of C using an entry in the table (C raised to its corresponding power) also multiplies the accumulator by X.

After this masking step, the value of the table entry corresponding to the block of k bits '00'

In FIG. 7B, following the k-ary square and multiply always algorithm with exponent 10110001 and using the first table of "unmasked values" will produce $C^{10110001}$ at the end of the sequence. Using the "masked values" table will produce a different result. The value in the accumulator is initialized with the (10) entry, equivalent to C raised to the power of two (10) multiplied by the mask X is raised to the power one (01), or ($C^{10}$*$X^{01}$)—with the exponents represented in binary, for convenience. After the accumulator is squared twice, it holds the value ($C^{1000}$*$X^{0100}$) The next two bits of the exponent are three (11), so multiplying by the masked entry for 11 ($C^3$*X) yields the value ($C^{1011}$*$X^{0101}$) After two more squares, the accumulator holds ($C^{101100}$*$X^{010100}$). The next two bits of the exponent are zero (00), so multiplying by the masked entry for 00 (1*X) yields the value ($C^{101100}$*$X^{010101}$). After two more squares, the accumulator holds ($C^{10110000}$*$X^{01010100}$). The next two bits of the exponent are one (01), so multiplying by the masked entry for 01 (C*X) yields the value ($C^{10110001}$*$X^{01010101}$). After each multiplication the accumulator holds the product of C raised to some prefix of D, by X raised to some exponent 010101 . . . 01 where the number of '01's equals the number of times the loop has iterated—but is otherwise independent of D.

Thus, by masking the four entries in the table with the same value of X, each multiplication by a table entry results in the exact same power of X contributing to Alpha. As a result, the value of Alpha is independent of D. Furthermore, the exponent D is masked by Alpha, because the sequence of squares and multiplies now depends on both D and on Alpha. The longer a loop is computed using this structure, the longer the sequence becomes. However, the power that X is raised to is a function of the length of the loop only; not, a function of the particular exponent value that is being used. (Values of Alpha other than '01010101 . . . 01' may arise from other loop structures—as will be seen below. However, these remain independent of D.) Because the sequence of squares and multiplies in the exponentiation loop depends on both D and Alpha, this masks the exponent against SPA; and because the parameter X is masking (blinding) the entries in the table, the exponent and message (ciphertext) are simultaneously blinded.

One advantage of the exemplary embodiment in FIG. 7B is that optimized squares can be used. As noted previously, in some algorithms, revealing which operations are squares leaks information about the key. However, if optimized squares are used with a square-and-multiply-always approach, then the pattern of squares does not reveal the key. It is noted that optimized squares may be roughly 30% faster than multiplies, which may partly offset the fact that (for a given cache size) a square-and-multiply-always algorithm uses more multiplies than many other algorithms.

One disadvantage of the exemplary embodiment in FIG. 7B may be the requirement of a high memory overhead. The number of entries required in the table grows exponentially with k (the number of bits that are being processed at one time). For a given k, the size of the table for the square-and-multiply-always algorithm is one entry larger than the standard k-ary algorithm, and k/2+1 entries larger than the sliding window algorithm. The memory cost may be doubled again if combined with AMM squares, although some embodiments of FIG. 7B also embody FIG. 6A and FIG. 6B without further increasing the size of the cache.

FIG. 7C shows another embodiment, in which blinding by a parameter B is also performed on the input C to produce C', and the exponentiation is performed on the input C'—that is, the input C is replaced with C'; $C^2$ with $(C')^2$; and $C^3$ with $(C')^3$. As with FIG. 7B, all entries in the table are masked. As a result, the value of 1 and all other powers of C stored in the table are multiplied by the mask X, which produces 1*X, (C')*X, ($C'^2$)*X, and ($C'^3$)*X.

As shown in FIG. 7C, C'=C*B which is equivalent to $(C')^{10110001}$=$(C^{10110001})$*$(B^{10110001})$. Since the exponent for the base B is the same as the exponent for base C, one can convert its inverting factor using the public key. The power of B is the exponent D. Because the unblinding factor corresponding to B depends on D, while the unblinding factor corresponding to X does not (but depends instead on Alpha), these unblinding factors are computed separately. However their product may also be computed and stored, allowing the exponentiation result to be unblinded efficiently using a single multiplication. In some embodiments, these unblinding factors are maintained separately and the device is configured such that one component (such as a cryptographic library) creates and stores B or X and its unblinding factor, while another component (such as an application) creates and stores the other value and its unblinding factor.

Applying Mid-Loop Updates

Applying mid-loop updates during exponentiation can be used to defeat higher order DPA attacks. As stated previously, there are many types of higher order DPA attack, including two that will be discussed in reference to this design. The first type of attack solves a clustering problem by solving for the clusters of different entries within a single trace, and can succeed even when inputs to the trace are appropriately masked. The second type of attack is a horizontal cross-correlation attack that integrates leakage across multiple traces.

Figure 8A:
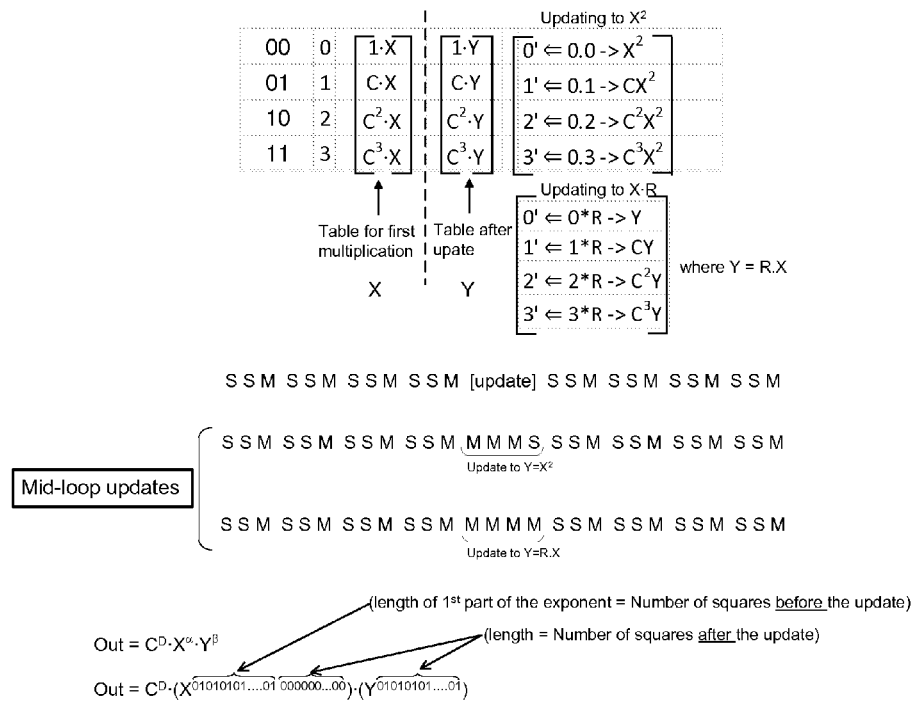
FIG. 8A illustrates exemplary embodiments of mid-loop updates within a trace.

Mid-loop updates can interfere with the aforementioned attacks by updating the mask parameters during the computation, effectively increasing the number of clusters that must be detected, and reducing the number of examples of each type being classified. FIG. 8A illustrates some embodiments of mid-loop updates.

FIG. 8A shows a mask X, base C, a table with four block entries, and a sequence SSMSSMSSM . . . , similar to that shown in FIG. 7B. The values 1, $C^1$, $C^2$, and $C^3$ corresponding to block entries (00), (01), (10), and (11), respectively, are first masked by X, and this produces X, C*X, $C^2$*X, and $C^3$*X, respectively, in a first table. The first table is the table used for the multiplications prior to a mid-loop update.

Next, a mid-loop update is applied during computation by multiplying the values (X, $C^1$*X, $C^2$*X, and $C^3$*X) corresponding to block entries (00), (01), (10), and (11), respectively, by some value to produce a table masked with a new masking parameter Y. This produces a second table containing Y, C*Y, $C^2$*Y, and $C^3$*Y, respectively, after the mid-loop update.

Thus, a first table is used for the first half of the exponent before the mid-loop update, and a second table is used for the second half of the exponent after the mid-loop update. In some embodiments, the update is performed without using or uncovering the unmasked powers of C. The final output of the calculation is given by $C^D*X^{Alpha}*Y^{Beta}$. In this configuration, each entry in the first two-bit table contains a power of C multiplied by one value X. As the exponentiation loop iterates, the accumulator holds a power of C multiplied by X raised to the exponent Alpha, where Alpha= 01010101 . . . 01. If there are m number multiplies, then Alpha will consist of m number of (01) values followed by a string of zeros. After the mid-loop update, the computation is switched to Y instead of X, and the Y value is raised to the exponent Beta, where $\beta$=01010101 . . . 01.

As shown in FIG. 8A, prior to the mid-loop update, there will be a (01) value for each multiplication in X. After the update, all the values that are in the accumulator at the point in which X is switched to Y will remain in the accumulator. Each subsequent squaring operation will effectively shift the exponent of the values in the accumulator by one bit to the left. The power which X is raised to (i.e. Alpha) is 01010101 . . . 01 followed by a string of zeroes, where the number of zeroes in the string of zeros equals the number of times the accumulator is squared following the update.

Thus, prior to the update, the number of bits in the sequence Alpha is equal to the product of the number of multiplications before the update and the number of bits per multiplication. As shown in FIG. 8A, the original two-bit table comprises four multiplication values (0, 1, 2, 3). After the update (switch from X to Y), the pattern 01 will repeat four times (i.e. 01010101), which is eight bits long. Basically, the number of bits after the update will be twice the number of multiplications, because each multiplication corresponds to a two bit portion of the exponent.

The exemplary mid-loop update of FIG. 8A can provide resistance to higher order DPA attacks. For example, an attacker performing a clustering attack may observe a large number of multiplies (100~1000 multiplies), instead of only four multiplies (as in the original two-bit table). Since there are numerous instances of each entry in the cluster, the attacker will then have to determine which of the multiplications are 0's, 1's, 2's, or 3's.

After the mid-loop update, since the actual entries in the original table have changed, the SPA and statistical leakage signatures for multiplication using those entries will also change. For example, prior to the update, the entry 0 holds X. After the update, the entry 0 holds Y. (We may call the updated entry 0' to indicate the entry 0 after the update; but many embodiments use the same memory location to hold 0' as held 0). In some embodiments, the values X, Y, and Y/X are unpredictable to an attacker, and therefore with high probability the relationship between entry 0 and entry 0' is different from the relationship between entries 0 and 1, between 0 and 2, between 0 and 3, between 0' and 1', between 0' and 2', and between 0' and 3', In some embodiments, the masking parameters X and Y can be randomly chosen during an initialization stage, but then may be stored in a memory and subsequent values for X and Y (and unmasking parameter) may be efficiently generated from previous values. In other embodiments, X and Y can be totally independent and may be generated (together with an unmasking parameter) during an exponentiation initialization step. In any case, an unmasking parameter corresponding to any X and Y pair can be found so long as both X and Y are invertible members of the group (for example, are nonzero). Calculating the unmasking value requires only knowledge of the modulus (e.g. N or P) and of the exponents Alpha and Beta (which depend on the loop length and on where the update occurs) but does not require knowledge of a secret exponent D. Thus mask parameters for an embodiment of this invention implementing RSA can be calculated using only the public parameters in the RSA key. Some embodiments are configured to accept a mask value (X) or set of mask values (X, Y, or X, R etc), and a corresponding unmasking value generated externally (e.g. by a personalization server). Some embodiments further perform a test to confirm that the unmasking parameter corresponds to the masks. Some embodiments contain countermeasures to glitch (fault induction) attacks, which have an effect of also confirming the correspondence between masks and unmasking parameter(s). Some embodiments calculate an inverse blinding factor corresponding to all masks simply by performing the masked exponentiation using a set of masks on an input C=1, using no unmasking—or using a temporary unmasking parameter of 1—and then taking whatever output results, and inverting it in the group (i.e. mod N or P) to obtain the correct unmasking parameter.

In some further embodiments, Y can be computed as a function of X, and this can be embodied with an efficient update process. (Because Y can be computed from X, such embodiments may also be more memory efficient.) In one embodiment, Y is the square of X. This has the additional advantage that values can be updated in place, without requiring extra memory. For example, updating table entry 3 from ($C^3$X) to ($C^3X^2$) requires multiplying by X. X is stored in table entry 0. So the update can be efficiently computed by calculating the product of 0 and 3 and storing the result in entry 3. Similarly, entry 2 is updated from the product of entries 0 and 2, and entry 1 is updated with the product of entries 0 and 1. Finally, entry 0 is updated with the square of 0.

When Y is a function of X, $X^{Alpha}*Y^{Beta}$ can be rewritten as $X^{Alpha'}$ for some exponent Alpha'. In the 2-bit example, with $Y=X^2$, Alpha' equals 01010101 . . . 0110101010 . . . 10, where the length of the '01' segment equals the number of squares prior to the update, and the length of the '10' segment is equal to the number of squares after the update. If more updates are performed by squaring, after the second the entries are masked by $X^4$, and after the third the entries are masked by $X^8$, etc. Each 'square' operation shifts the bits of Alpha' left by 2, and each multiplication by a table entry adds the corresponding power of X into Alpha'. So right after the update from mask=$X^2$ to mask=$X^4$, the low order bits of Alpha' are . . . 1010. After two squares, Alpha' ends with . . . 101000. After the next multiplication (which includes a parameter masked by $X^4$ which—expressing the exponent in binary—is $X^{100}$), the value of Alpha'= . . . 101000+100= . . . 101100. For convenience, when Y is a power of X, this exponent may be referred to as "Alpha" without the "prime".

In some embodiments, the mid-loop update can be performed more easily with an additional memory cell. As noted previously and as shown in the equation in FIG. 8A, to move from table mask X to table mask Y during the update (or from the table before the update to the table after the update), the table entries may be updated by multiplication. If a specific new value of Y is desired, that is independent of X, the update may be performed by computing the inverse of X (in the group) and then R=Y*$X^{-1}$ (in the group), and updating all table entries by multiplying with R. In practice, the table masked by X can simply be multiplied by a random R which can be any value—that is, some embodiments generate an R at random such that R is guaranteed (or has high probability) to be invertible in the group. In this case, Y=R*X. The inverse blinding factor may be calculated from X and Y, as before.

To obtain the correct output from a modular exponentiation, the value at the end of the exponentiation loop needs to be multiplied by an unblinding factor. As noted above, the blinding factor is a function of X and Y. Calculating a blinding factor for new X and Y values generally involves computing an inverse, and this may require more computation than is desirable. So an efficient approach involves storing the blinding factors X and Y and a corresponding unblinding factor—then using these to efficiently compute new blinding factors in subsequent computations. This will be discussed in more detail below.

As stated previously, one embodiment of the mid-loop update comprises Y being the square of X. In this embodiment, the algorithm searches from the left table to the right table and finds a new value derived from the multiplication of one table entry by another table entry. If the updated zero entry is computed last, the updates can then be performed in place. An exemplary algorithm is provided as follows. First, the third entry is multiplied by the zero entry, and the resulting value overrides the previous third entry in the table. Next, the second entry is multiplied by the zero entry, and the resulting value overrides the previous second entry in the table. Following that, the first entry is multiplied by the zero entry, and the resulting value overrides the previous first entry in the table. Lastly, the zero entry is squared and the resulting value overrides the previous entry zero in the table. Performing the square-and-multiply-always exponentiation loop with masked table leads to the sequence—SSM SSM SSM SSM . . . . At the update step, an update sequence comprising a block of multiplies (MMMS) is inserted in between two SSM sequences, as shown in FIG. 8A. (If multiple cores are available, the operations may be performed in parallel, so long as the zero entry is read for all multiplications before it is overwritten by the square.)

The block of multiplies (MMMS) is the SPA signature of the mid-loop update algorithm. Basically, the update of the table mid-computation allows the multiplies before the update to group into a different set of clusters than the multiplications after the update, thereby providing resistance to higher order DPA attacks (e.g. clustering attacks). For k-arry exponentiation (i.e. with $2^k$ table entries), each update increases the total number of "clusters" in the exponentiation by $2^k$. For example, in a 5-bit implementation, the table holds 32 entries. An attacker would need to correctly classify multiplications into 32 clusters in a normal k-arry exponentiation implementation. With one update in the middle of the modexp loop, the attacker would need to classify each operation into one of 32 clusters, (with half as many members in each cluster) and would also need to determine the mappings between each of 64 clusters and a 5-bit sequence of bits. Update steps may be performed many times during an exponentiation. With two updates performed in the calculation, in a 5-bit implementation, each operation would need to be classified into one of 32 clusters (with one third as many members in each cluster), and then the attacker would need to determine the mapping between each of 96 clusters and the 5-bit sequences of bits. The method of updating the masks mid-loop is complimentary to (and can be employed with) embodiments of 6A and 6B which may (all together) also multiply the number of clusters by 8. In 5-bit implementation with one update step in the middle, using the L-R swapping and negation using the "++" and "--" quadrants, each multiplication would need to be classified into one of 128 clusters, and decoding the exponent would involve identifying the mapping between 256 clusters and sequences of 5-bits. Although in general optimized squares can be used throughout this algorithm, some embodiments turn some sequences of k squares into k AMM squares—which has the same SPA signature as an update step. (If using the 'squaring X' approach for updates, an AMM square may be used to update the mask for table entry '0'.) Employing AMM squares in this way may introduce additional confusion into the cluster classification problem.

As noted previously, an SPA trace can reveal to an attacker which clusters belong in which region. When solving the clustering problem, an attacker who can identify the location of updates can treat clusters prior to the update as disjoint from clusters after the update. If the attacker can determine the correspondence between clusters before the update and the clusters afterwards (i.e. can connect the 0 cluster ("zero") to the 0' cluster ("zero prime")) they can perform a high-order attack as though there had been no update. If the relationship between X and Y is effectively random (from the perspective of an attacker who observes only side channel leakage of X and Y), then connecting corresponding clusters may require the attacker to focus on the multiplies that take place during the update step itself—i.e. multiplies in which X is an input and Y is an output. It is one hypothesis of this design that input/output correlations are harder to exploit than other kinds. If the signal-to-noise ratio is low enough, it may not be solvable by analyzing a single trace—and the attacker may therefore have to integrate leakage across many successive traces in order to succeed in detecting a correlation. To prevent the aforementioned attack, some embodiments update the exponent D between successive traces, which changes the cluster each multiplication belongs to.

In some embodiments, the mid-loop update can include exponent blinding where a base C is raised to the exponent D and another parameter which is added in modulo P or N. Here, there is a parameter $\phi(P)$ or $\phi(N)$, which is the order of the group modulo that modulus, and which allows an equivalent exponent to be produced. An exemplary equation is given by $C^{D+k\cdot\phi(P)}$ mod P=$C^D$ mod P.

In exponent blinding, the order of prime of P is given by P−1. Thus, any multiple of P−1 added to the initial exponent D produces the exact same result when the calculation is performed modulo P. The randomization changes the actual bit sequence that is being used in the exponentiation. Although the exponents are all equivalent, they are not identical. For example, a certain sequence of bits may appear in the binary representation of one exponent, and a different sequence of bits may appear at the corresponding location in the binary representation of a different exponent. In some cases, an attacker who is able to partially solve a clustering problem (or exploit any other leak) to recover a subset of the bits corresponding to one exponent $D+k_1*\phi(P)$, may not be able to solve or integrate this information with leakage from other exponents $D+k_j*\phi(P)$ to determine the value of the exponent D.

If exponentiations with D implemented using 'masked' exponents, the bits in the exponent are constantly changing, and a given k-bit sequence from different exponents will likely correspond to different entries in the table. (The n'th multiplication in a second trace will likely belong to a different cluster than the n'th multiplication in a first trace.) However, if the leakage rate is so great that SPA characteristics alone are sufficient to reveal what the parameters to the multiplies are, then an attacker may be able to decipher the exponent. For example, if the exponent is not randomized and an attacker is able to collect, e.g. ~1000 power traces, the attacker can average all those power traces and perform an SPA-like clustering attack.

Alternatively, the attacker need not average the traces to succeed in the attack. If an attacker can use statistical methods to determine that all ~1000 operations occurring at a location belong to the same cluster, the attacker will have sufficient information to perform a clustering attack. However, if the exponent is randomized, the attacker may have to perform a successful clustering attack from a single trace.

Thus, some embodiments of the mid-loop update algorithm include the use of exponent randomization.

In some embodiments, the update step uses a parameter R that is derived independently of X. If the update step uses multiplication by a parameter R (in place of multiplication by table entry 0), then this may greatly increase the difficulty of connecting clusters by attacking the input/output leakages. And again, when the exponent is randomized, the attacker may have to complete the clustering attack using a single trace. Unless the leakages are extremely high, it is expected that input/output correlations will be low and it would not therefore be feasible in practice to complete a clustering attack from a single trace.

As noted previously, one method of performing a mid-loop update is by squaring. In addition to squaring, there are other methods of performing mid-loop update. FIG. 8A also shows another embodiment of a mid-loop update using a second parameter R. As shown in FIG. 8A, the original table entries (0, 1, 2, 3) are multiplied by R to yield (0*R, 1*R, 2*R, 3*R). Thus, the entries become masked by Y, where Y=R*X, to produce (Y, C*Y, $C^2$*Y, $C^3$*Y). Thus, Y is a function of R and X.

When the exponent is updated mid-loop through multiplying by R, the update exponent will be in the form of the sequence MMMM, instead of the sequence MMMS. As shown in FIG. 8A, the sequence MMMS corresponds to an update by X, whereas the sequence MMMM corresponds to an update by R. (And embodiments may use an AMM square in an update by X to produce a sequence that is indistinguishable in SPA from MMMM.)

In some embodiments, the update comprises a plurality of updates throughout the computation. In some embodiments, the update can be performed regularly, in contrast to other embodiments in which only one update is performed mid-computation.

In some further embodiments, the optimal number of updates can be determined by analyzing the clustering problem. In these embodiments, a strong countermeasure can be obtained if the computation ends at a point where the attacker can only observe one multiply for each cluster. In practice however, it may be likely that an attacker may observe two entries in some clusters, one entry in some clusters, or even no entries in some clusters. (For example, in a 4-bit implementation with 16 entries in the table, randomized L-R swapping, and using "+−"/"a−+" quadrants, if updates are performed every 64 multiplications—or every 256 squares—then on average a multiplication with LHS=A (the accumulator) and RHS=(−($C^{11001}$*X)) will only be observed once. However, for certain random exponents and a certain sequence of L-R and +/− decisions, a multiplication with these LHS and RHS may occur two or more times in the region, while for others it may not occur at all.) The likelihood of seeing any particular number of instances (if all decisions and exponent bits are random and i.i.d.) is approximated by the Poisson distribution with Nmult=the number of multiplications between updates, and lambda=(the number of clusters)/Nmult. Nevertheless, the chance of getting a few examples in one cluster may not significantly diminish the difficulty of the clustering problem, because the attacker still needs to correctly classify all operations that are present.

In some embodiments, the number of exponentiation loop iterations (and multiplications performed) before performing an update is such that on average two examples in each cluster are expected. In some embodiments with table size $2^k$ and cluster multiplier T (for example equal to 1/2/4/ or 8, depending on the combination of L-R swapping and negation quadrants used), an update is performed after about $(2*T*2^k)$ loop iterations. For other embodiments, the update is performed when the number is expected to be three or four examples per cluster (e.g. $3*T*2^k$ or $4*T*2^k$) or even more. It is believed that for many leakage functions, the classification problem is challenging for an attacker to solve (with low enough error rate for the attack to succeed) so long the number of examples per cluster is small. Some embodiments in which the exponent is being randomized implement more than $(4*T*2^k)$ multiplications between updates.

In some embodiments there are fewer loop iterations before an update is performed. For example, an update can be performed once every iteration. An update equates to one multiply for each element in a table, and in a table with four entries, this will yield four multiplies. The tradeoff may be worthwhile in some embodiments such as one in which the exponent is not being randomized. However, if half of the total number of multiplies are used for the exponentiation (i.e. are changing the value in the accumulator) and the other half are used for updates (i.e. are changing value(s) in a cache), this may result in extremely high resistance to HODPA attacks at the cost of slow performance. The performance hit may be minimal in embodiments that perform the multiplications of the update step in parallel—and performing them in parallel may further increase resistance to side channel leakage.

Unmasking and Efficiently Finding New Masks

When updates are performed by squaring, all intermediate masks can be expressed in terms of the initial JMEB mask X. (JMEB, short for 'joint message and exponent blinding', is a name for embodiments of FIG. 7A, FIG. 7B, FIG. 7C, FIG. 8A, FIG. 8B, FIG. 8C, or FIG. 8D.) The inverse of X is a function of modulus N, of the length of exponent D (the number of iterations of the loop), and of which iterations are followed by updates. Because the length of exponents D can vary when exponent randomization is being used, some embodiments compute more multiple unmasking parameters for X, corresponding to different lengths. In some embodiments an unmasking parameter is generated that corresponds to the longest expected exponent, and the exponentiation loop is run for the corresponding number of iterations.

If X and R are independent, with Y=X*R, then separate unmasking parameters can be computed corresponding to specific lengths for X and Y. If the exponent D is longer than Beta and shorter than Alpha, then D may be expanded to the length of Alpha by prepending 0 bits, and computation can proceed starting with the accumulator initialized to 1, the cache initially masked with X and mixing in R at the point corresponding to the length of Beta. If the exponent D is shorter than Beta, however, then D may be expanded to the length of Beta by prepending 0 bits, and the computation can proceed starting with an initial mask of (Y=X*R), the accumulator initialized with $Z=X^{Alpha''}$, and not performing an update step. Here Alpha" equals Alpha with all the low-order zeros truncated—i.e. Z is exactly the value the accumulator would have held had it been initialized with 1 and then squared and multiplied by X for a number of iterations equal to the length of Alpha minus the length of Beta. In this way variable-length exponents D can be accommodated efficiently, by storing an extra parameter Z together with the regular parameters X, R, and the unmasking parameter UX.

Therefore, upon running the modular exponentiation loop, if there is at least a first mask, and a pre-calculated inverse masking primary that is a function of the length of the exponent, then the exponent has to be processed at a constant length (e.g. 10-bits long, or the length of the longest exponent), corresponding to the exponent Alpha that was used when deriving the unmasking parameter. If a longer exponent is submitted, some embodiments accept it but leave its first few bits unmasked. (In non-CRT RSA, the high-order bits of the exponent do not necessarily need to be kept secret; however if exponent randomization is being used, revealing the high-order bits could undesirably reveal part or all of the bits of the mask.) Alternatively, the embodiment may reject the exponent if it does not allow computations of an exponent greater than a nominal length.

In general, as discussed above, the unblinding factor (for a given set of parameters) can be computed using one exponentiation and computing one inverse. However, if a sequence of exponentiations needs unique blinding factors, much more efficient methods exist for obtaining a set, if the parameters are known in advance and precomputed values can be stored. The main approach takes advantage of the fact that if $\{X, R1, R2, R3, \ldots\}$ are a set of masks and UX is a corresponding unmasking parameter, then other sets of masks and unmasking parameters can be computed efficiently from it. For example, $UX^A$ is also an unmasking parameter for the set of masks $\{X^A, R1^A, R2^A, R3^A, \ldots\}$ i.e. where each parameter is raised to the A'th power. In many designs of the background art, blinding factors B and U are maintained such that $B=1/U^E$, and $B^D*U=(1/U^E)^D*U=(1/U^{ED})*U=(1/U)*U=1 \mod N$. Those blinding factors are often updated by squaring. Clearly this works, because if $(B^D)*U=1 \mod N$ then $((B^2)^D)*(U^2)=((B^D)^2)*(U^2)=((B^D)*(B^D)*(U*U))=((B^D)*U)^2=1^2=1 \mod N$.

This may be efficient, but as was demonstrated with the doubling attack, if the attacker knows that the input to an operation in one trace may be the square of the input to that operation in the previous trace, this creates a relationship that can be tested—and potentially a vulnerability that can be exploited. In the higher security models, any predictable relationship between the i'th operation in the h'th trace and the j'th operation in the g'th trace creates a potential vulnerability. In a slightly broader security models, a goal is to avoid the relationship where an intermediate in one exponentiation is predictably the square of an intermediate in a previous computation.

This is especially a concern when the mid-exp updates compute Y from X by squaring, because the sequence of masks that occur after updates within one exponentiation (X, $X^2$, $X^4$, $X^8$, etc.) is exactly the sequence of values of X that would be observed between traces if X were updated between exponentiations by squaring.

Thus, if the values are updated by squaring, based on a previous map (e.g. (1 3 3 0) corresponding to (0', 2', 1', 2')), and an attacker can determine that a multiply at one location is by X and the multiply at another location is by $X^2$, the attacker can subsequently perform a doubling attack to attempt to identify that relationship.

One very efficient alternative to finding subsequent (X, UX) masks by squaring is to find the next mask by cubing: (X_next=$X^3$, and UX_next=$UX^3$). Although this could be attacked by a 'tripling' attack, it greatly reduces the scope of the attack because #1 all of the mid-loop updates are performed by squaring, so no longer match the out-of-loop updates, and because #2 exponentiation loops are full of squaring operations, but it is extremely rare that the input to one operation is the cube of the input to a previous operation. Furthermore, although in principle both a JMEB blinding factor and a regular blinding factor could be updated by cubing, some embodiments cube the JMEB blinding factors but update the other blinding factors by squaring—effectively yielding intermediates in a subsequent exponentiation that are neither the square nor the cube of intermediates in a previous exponentiation. Note that cubing is nearly as efficient as squaring, and can be accomplished with one square and one multiply.

Some embodiments devote more memory to the problem, storing JMEB masks XA and XB and corresponding unmasking parameters UA and UB, such that UA is the unmasking parameter for XA for a given set of parameters (N, exponent length, update frequency) and UB is the unmasking parameter for XB over the same parameters. The pair (XA,UA) is used to mask an exponentiation, then the pairs are updated as follows. First (XA,UA) is updated by computing XA'=XA*XB mod N, and UA'=UA*UB mod N. Next, (XB,UB) is updated by computing XB'=XA'*XB mod N, and UB'=UA' *UB mod N. It can be shown that if $XA_1$ (the first value of XA) can be expressed in terms of some $F^1*G^0$ where $XB_1=F^1G^1$, then in the first iteration and at each step the value in XA and XB can be expressed as a product of F and G each raised to some power, where the powers are Fibonacci numbers and the power of F in one of the terms is always one Fibonacci number higher than the power of G. This update method is very efficient, requiring only four multiplications total to update XA, XB, UA, UB. Other embodiments use other methods of updating and combining two blinding factors to produce a sequence of blinding factor that is hard to attack with a doubling-attack type of approach. Another example is one in which XA,UA is updated by cubing, while XB,UB is updated by squaring, and the blinding factor for the n'th trace is the product of XA and XB. Other powers, combinations of powers, or combinations of the Fibonacci approach and separate power-based approaches may be used; an embodiment may even use one method between one pair of traces, and a different method between the next pair.

Although some embodiments do not update the mask X between every pair of traces, in general it is a good idea to regularly update the mask (or mask pairs).

Figure 8B:
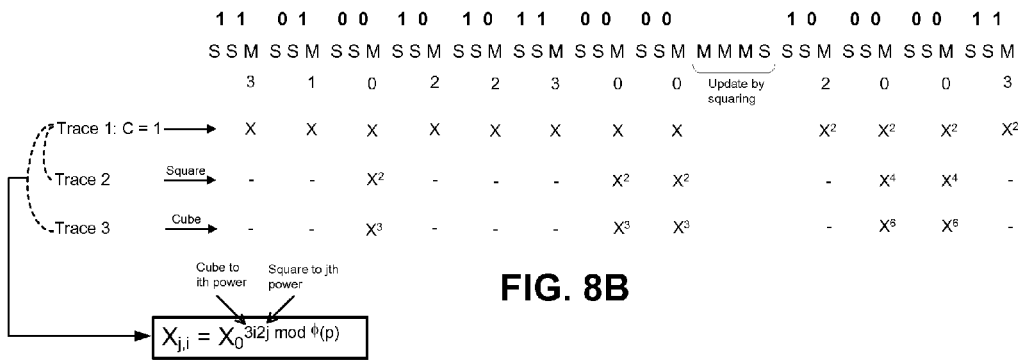
FIG. 8B illustrates exemplary embodiments of different mid-loop updates between traces.

FIG. 8B shows an SSMSSMSSM . . . exponentiation using table with entries (0, 1, 2, 3) masked by X, which yields 1*X, C*X, $C^2$*X, and $C^3$*X. As stated previously, the mask X can be updated by squaring at each update step within a trace, and the mask X can also be updated by squaring from one trace to the next (i.e. X and the corresponding unmasking parameter are also updated by squaring between traces).

In FIG. 8B, an update by squaring is performed on an exemplary exponent as shown: 11 01 00 10 10 11 00 00 [update by squaring] 10 00 00 11. FIG. 8B also shows which multiply is performed corresponding to the table entry that the operand is being extracted from. For example, FIG. 8B shows the multiply is by 3, 1, 0, 2, 2, 3, 0, 0, 2, 0, 0, 3. For a first trace, an attacker submits C=1. Prior to the first update, all the multiplies are multiplies by X. Because the first update is by squaring, all the multiplies in the next part of the exponent are multiplies by $X^2$. If there is more than one update, the multiplies between the second update and third update are by $X^4$, the multiplies between the third update and fourth update are by $X^8$, and so forth.

With reference to FIG. 8B, a random ciphertext is submitted for a second trace (trace 2). It is assumed that the value of the mask X was updated by squaring between traces. Table entries for the second ciphertext are shown. The first table entry for the second trace corresponding to the (00) entry is $X^2$, as is shown in the table. Because the second ciphertext is random, the other table entries (non-zero entries) for the second trace are effectively random (unrelated to the values in the table for trace 1) and are denoted as '-' in the table.

In the section below the SSMSSM . . . sequence in FIG. 8B, the value of table entry 0 has been shown beneath each M that uses it (exponent bits 00). As shown, these multiplications are by $X^2$ prior to the update, and by $X^4$ after the first update; all other values (exponent bits other than 00) are denoted by '-' indicating that they are not expected to correspond to any operation in the prior trace. Thus, the update by squaring proceeds from left to right along the exponent, and from one trace to the next trace.

However, the update by squaring from left to right along the exponent and from one trace to the next may expose vulnerabilities in the system to cross-correlation attacks. For example, an attacker can use one trace to define a template for the multiplies by 2's, multiply the values by $X^2$, and submit a random separate text in the first region where there is a string of multiplies involving $X^2$. This gives a strong baseline that is useful in solving a more generic clustering problem, as this contains a long string of known values, and relationships between other values of exponent bits can be tested by judicious choice of first and second ciphertext. This situation also sets up testable relationship between $X^2$ and $X^4$ clusters in sequential traces, and again an attacker can easily begin with a long baseline of the $X^4$ values in the top trace. In conclusion, it may be undesirable for the masks to be updated between traces using the same relationship that is used to update the masks when moving from left to right within a single trace.

In some embodiments, the mid-loop update comprises an update by squaring from left to right along a trace, and an update by "cubing" (raising the exponent to the third power) from one trace to the next. By using a combination of squaring and cube functions, the same relationship across and between different traces can be avoided.

As shown in FIG. 8B, if the update is by cubing, the values will be multiplied by $X^3$ prior to the first update and $X^6$ after the first update. This can counter clustering attacks and reduce cross-correlation problems because the square value (2) and the cube value (3) are relatively prime to each other.

The above method of updating using a combination of squaring within a trace and cubing between traces is further described as follows:

Between traces:

$$X_i = X_0^{3^i} \tag{1}$$

As shown in Equation (1), the $i^{th}$ value is repeatedly raised to the $3^{rd}$ power (cubed). In other words, the exponent value is multiplied by 3 each time. The computation updates by 3 proceeding from one trace to the next trace, and at the i'th trace has been updated by $3^i$ relative to the initial trace.

Within a trace:

$$X_{j,0} = X_0^{2^j} \tag{2}$$

Equation (2) shows a $j^{th}$ operation in a first (0) trace, where the update is by 2 after the $j^{th}$ update, and moving from left to right within the first trace (0) trace.

Between and within traces:

$$X_{j,i} = (X_i)^{2^j} = (X_0^{3^i})^{2^j} = X_0^{3^i 2^j} \tag{3}$$

Equation (3) shows the substitution of equation (1) into equation (2), and the $j^{th}$ operation in the $i^{th}$ trace. Here, for the $i^{th}$ trace, the $i^{th}$ input is substituted by $X_i$. The exponentiation is given by $X_0^{3^i 2^j}$. Since $3^i$ and $2^j$ are relatively prime, there should not be any collisions between the squaring and cubing values.

$$X^{3^i 2^j} \bmod P = X^{(3^i 2^j \bmod \Phi(P))} \bmod P \tag{4}$$

Equation (4) shows equation (3) with a parameter $\phi(P)$. As noted previously, $\phi(P)$ is a simple function of P, and allows an equivalent exponent to be produced.

However, updating by cubing does not eliminate the possibility of the cross-correlation attacks entirely. The lower part of the chart in FIG. 8B shows only the value of the non-accumulator parameter in each multiplication. It is possible, however, that the value of the accumulator may indeed hold $X^3$ at some point, or some other power that can be expressed as X raised to $3^a$ times $2^b$ for some nonzero a and b. If such a value exists, it may be detectable by cross-correlation attack—and a large baseline of X raised to $3^i * 2^j$ for many various (i,j) can be obtained by submitting many sequential C=1. If the 'L-R' swapping is not employed, then an attacker may be forced to mount an attack exploiting an LHS-RHS correlation in order to detect this leak. This may be challenging. If the exponent D is randomized between successive traces, this may be sufficient to render the cross-correlation attack impractical.

As described above, methods that use two cached masks (XA,XB) can employ an update step (such as the Fibonacci method) that renders intermediates practically unpredictable between traces, and prevents these sequential-trace cross correlation attacks.

With reference to FIG. 8A, the device may perform updates by R. Sequential updates may use different values, but, with reference to FIG. 8C, may also make use of the same value R, which saves memory. After each update by R, the value Y can be expressed as X times some power of R. Between traces, the value of X may be updated by squaring. The value of R may be updated between traces—but may also not be updated. (Should an attacker eventually discover the value of R, they may compute and submit $C=1/R^i$ mod N for various i, but the masking by X may hinder an attack.

If a combination of masks ever cycles (results in the same numbers being generated periodically), this presents a weakness in the system. For example, if an LHS or RHS input to one operation is the same as an LHS or RHS input to a second, and there exists a further operation which is the same as the other, and so forth, the periodicity in occurrences can allow an attacker to detect the reuse of an operand (e.g. by moving down two traces and then moving right by 4 operations), which may reveal information about a secret exponent being processed.

Therefore, a designer's goal is to design a system in which the masking is set up such that it is very unlikely that there will be two multiplies using the same input, regardless of the power. In such a system, there is a very low probability that two random numbers will be the same, and even if two numbers are the same, the event will not happen periodically.

By incorporating different exponential powers ($3^i$ and $2^j$) in the update, the resulting exponent will be larger compared to an exponent that is updated equivalent modular by squaring. To determine the relationship between the parameters, an attacker has to analyze the values of $3^i$ and $2^j$ and determine if there is a periodic systematic issue. For example, if there is a value of i and j that collides for a particular P, then the values are going to collide for that P regardless of what the base is.

If an attacker can find a periodic relationship, it means that for a particular value of C and P, there is a relationship that allows the attacker to determine the locations of i and j, and if the attacker has information pertaining to that relationship, the attacker can use the information to learn about P or solve for the exponent. (And in exponentiations where P is a secret RSA prime, knowing P reveals the exponent.) It is relatively easy to exploit a design with many periodic relationships using a HODPA attack, such as a doubling attack.

Thus, one of the motivations in the embodiments disclosed is to avoid having the aforementioned periodic relationships in the design of the cryptosystem. First, it has motivated changes in the update between traces, such as not using an update by squaring. In some embodiments, the update involves squaring the values proceeding from left to right within a loop structure, and using an update other than squaring outside of the loop structure (i.e. updating the factors between rounds using a different method other than squaring).

In some embodiments, instead of updating by squaring proceeding from left to right, the update can involve multiplying by any value. For example, given an initial parameter Y and a blinding factor X, instead of updating by squaring, the value can be updated by R where R=Y/X. For this update, the following are required: X, R, and an inverse parameter that is a function of X, R, and Y.

Detection of collisions between values will next be described with reference to FIG. 8C. First, a table corresponding to X, CX, $C^2X$, $C^3X$ is generated. After the first update, the table transforms into XR, CXR, $C^2XR$, $C^3XR$. After the second update, the table transforms into $XR^2$, $CXR^2$, $C^2XR^2$, $C^3XR^2$. The updates continue such that after the $j^{th}$ update, the table becomes $XR^j$, $CXR^j$, $C^2XR^j$, $C^3XR^j$, and so forth. As a result, Y can be updated, moving left to right, by repeatedly applying R, without requiring a unique value of R at each update.

For the value X, if the same R is multiplied across the exponent each time, $XR^j$ will be obtained for each $j^{th}$ value with no relationship between XR, $XR^2$, $XR^3$, $XR^4$, $XR^5$ . . . . Thus, X can be squared, and there will be no distinct relationship between XR and $X^2R$, or between $X^2R$ and $XR^2$.

However, for the values X and $C^2X$, if X is updated by squaring, an attacker may be able to submit an input message to determine the square relationship between CXR and $C^2X^2R^2$.

Also, if X is cubed, or if any power of X is used such that the maximum number of updates is, e.g. ~100 updates, an attacker may be able to observe the values XR through $XR^{100}$ if the update is multiplied by R each time. If the squaring of X outside of the loop is replaced by raising X, to some power I ($X^I$), and if I is a number less than 100, as long as X is updated using an exponent less than 100, an attacker may be able to identify the values ($X^I R^I$) by submitting C and $C^I$ at different locations. For example, the values ($X^I R^I$) may potentially occur in a computation if the sequence at the top of the exponent includes I. This relationship be exploited at different times depending on the exponent that is being used—i.e. for certain values of D it leads to relationships that can be tested using chosen C values, where such relationships are not present for other values of the exponent D, and tests for presence or absence of such relationships therefore reveals information about D. An attacker can identify when these collisions occur and the attacker can submit a message that will cause collisions for some exponents, but not for other exponents. When the collisions occur, the attacker can then gather information about the system.

It has been noted that updating any exponent by squaring from left to right can compromise a system because a doubling attack can target the squaring correlation. Therefore, in some embodiments, it is preferable that the parameters are not updated by squaring from left to right across a trace.

Figure 8D:
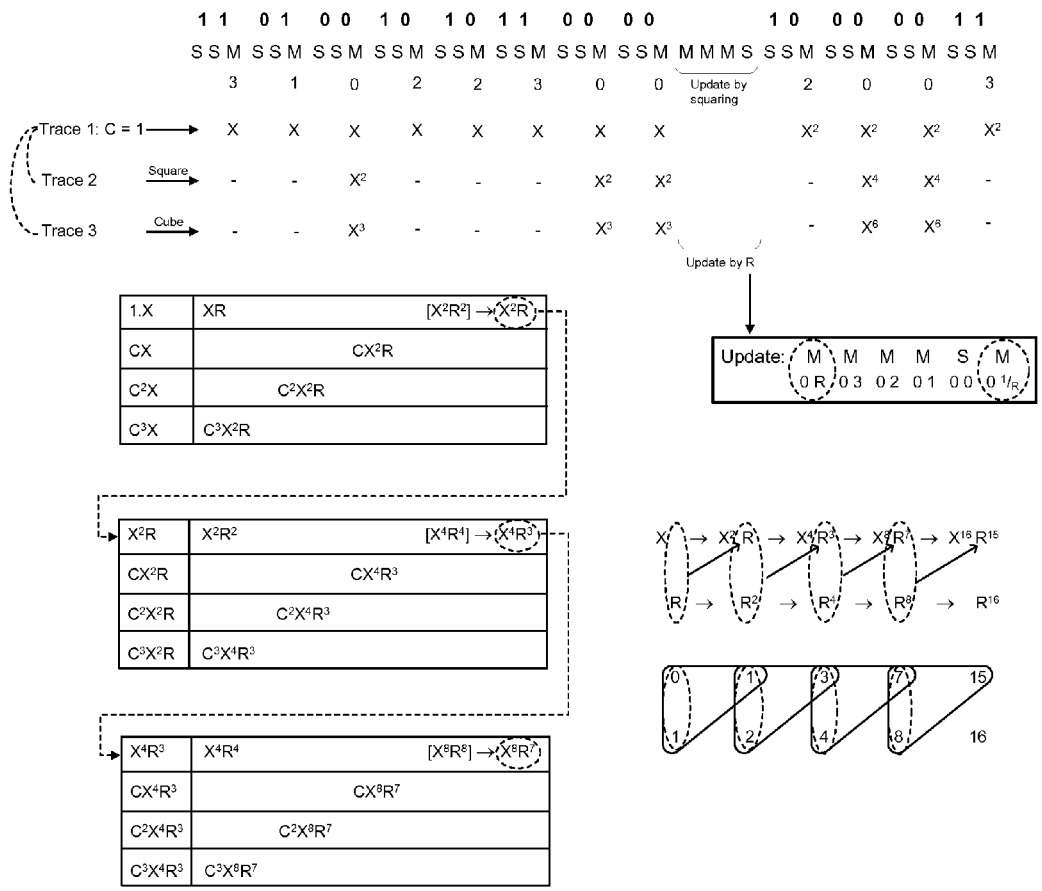
FIG. 8D shows an exemplary embodiment in which the mid-loop update incorporates a Fibonacci number-based update moving from one trace to the next.

FIG. 8D shows an exemplary embodiment in which a Fibonacci number-based update moving from one trace to the next is used to address the aforementioned deficiencies in updating by squaring across a trace.

Updating by a value R across the calculation requires a second inverse $-(X, R, I_{inverse})$ remote. However, $(X, R, I_{p11}, I_{p12})$ may be required if the update proceeds by a number of different ways. The equation for the above depends on how R is used. For example, if it only involves multiplying by R's, then the result of the calculation is given by $C^d * X^{10101\ldots01} * R$ to the respective exponent.

As shown in FIG. 8D, the updated values also updates R. X and R are first multiplied in the first update, and R is also updated by squaring to become $R^2$ after the first update. After the $k^{th}$ update, $R^k = R_o^k$, and the mask is given by $mask_k = XR_o^{k-1}$. FIG. 8D shows the values for $mask_k$ for the first four values of X, corresponding to the results of $XR^{2-1}$, $XR^{4-1}$, $XR^{8-1}$, $XR^{16-1}$, respectively.

In some embodiments, the value is multiplied by R before the update by squaring. The update by squaring also squares the value to produce $R^2$. At the end of the update by squaring, the updated value is multiplied by 1/R to produce R again. This is to eliminate the squaring correlation (from $R \to R^2$) to prevent cross-correlation attacks. Thus, in these embodiments, in addition to the regular update by squaring, there are two additional multiplies to be performed (the first multiply is by R, and the second multiply is by 1/R). The exponent after the $j^{th}$ update is $X^{2j} R^{2j-1}$. Also, because the power of X (i.e. 2j) and the power of R (i.e. 2j−1) always differ by 1, the two numbers will be relatively prime to each other.

In some embodiments, the updated step proceeds from left to right by methods other than squaring. For example, squaring the composite by adding in R can mitigate the correlation problem associated with squaring.

As noted previously, the string of multipliers from left to right across the computation ($n^j$) and string of multipliers through a long set of traces ($n^i$) can cause the system to be vulnerable to doubling attacks if any of the i-j pairs match up. To counter the doubling attacks, the system may require additional countermeasures in addition to a mask update by squaring.

In some embodiments, the mask update by squaring can also include increasing the number of clusters. In some of these embodiments, the number of clusters can be increased (doubled) by switching the signs of the parameters (positive to negative, and vice versa). In some other embodiments, the number of clusters can be increased (doubled) by switching the left hand side and right hand side multiplicands. The advantage is that the increase in the number of clusters in each of the above cases does not require an increase in the amount of memory.

In addition, increasing the number of clusters may allow fewer update steps to be used during the computation. For example, the frequency of update can be based on the number of items in each cluster. For a table containing four entries, the four multipliers will give rise to four clusters. However, if the signs (positive/negative) and parameter sides (left-hand-side/right-hand-side) are switched, this can produce sixteen clusters for every four entries in the table, which means that for sixteen multipliers, an attacker may likely observe only one item per cluster on average. This can also mean that some of the clusters have two items in each cluster, and some of the clusters will have no items, which creates confusion for the attacker.

Since the update step varies with the length of the original table, it may be preferable to have other methods of creating more update tables or creating more clusters that are not proportional to the length of the original table. If the size of the table increases, the size of the update step will also increase.

Cryptographic Device

Figure 9:
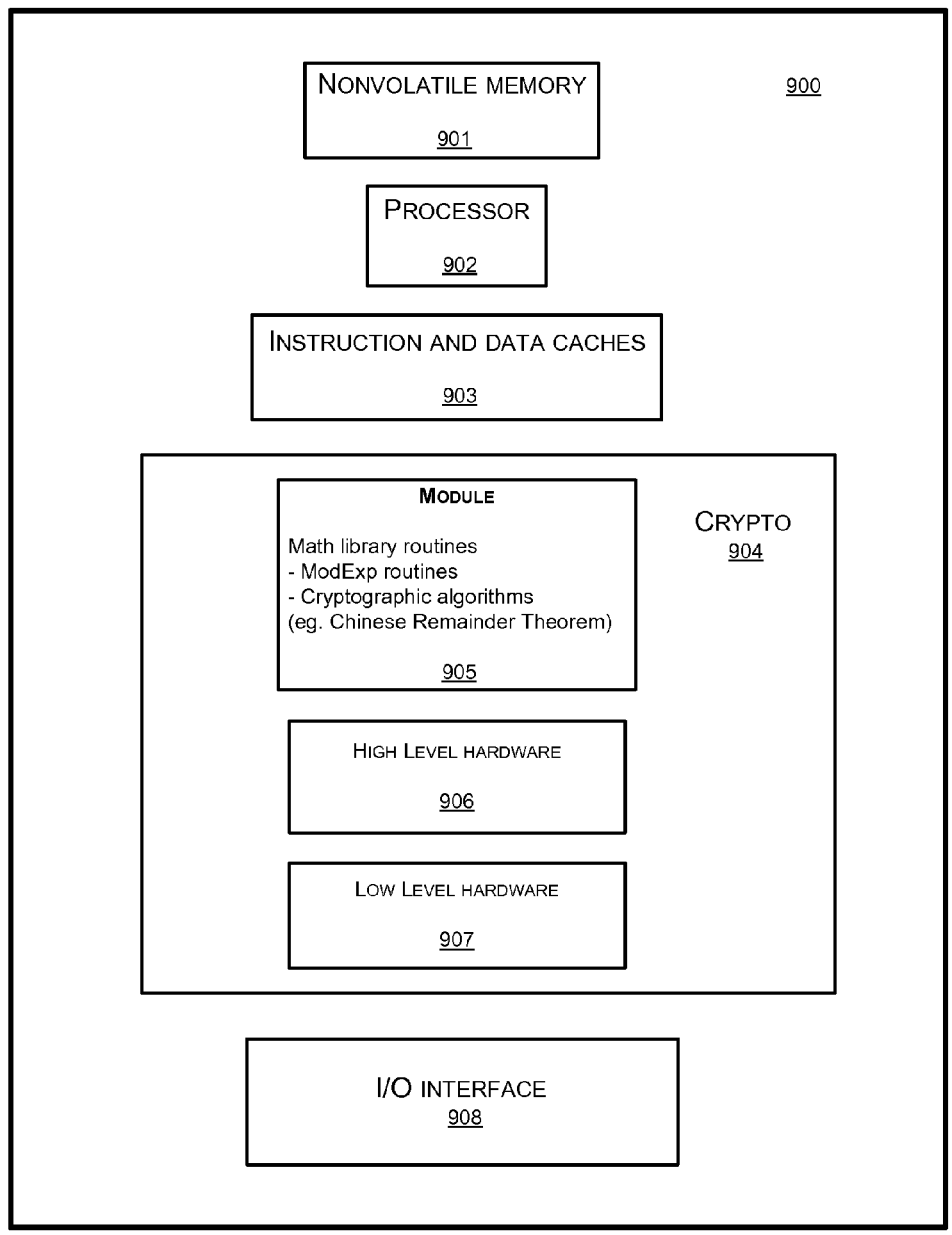
FIG. 9 illustrates a block diagram of an exemplary system consistent with the invention.

FIG. 9 shows the application of principles described herein embodied in a device (900). For convenience, depending on context, the reference numerals may refer to steps in a process, and/or to quantities used (or produced) by such process steps. As shown in FIG. 9, in at least one embodiment, a device 900 comprises nonvolatile memory 901, at least one processor 902, at least one instruction and data cache 903, cryptographic hardware 904, and an input/output interface 908.

Nonvolatile memory (NVM) 901 can include ROM, PROM, EPROM, EEPROM, battery-backed CMOS, flash memory, a hard disk, or other such storage that can be used to store a key and/or other information, as needed to implement the various embodiments described herein.

Processor 902 may be, for example, a single or multiple microprocessors, field programmable gate arrays (FPGAs), or digital signal processors (DSPs) capable of executing particular sets of instructions.

Cache 903 is local memory within the device or chip. For example, cache 903 may be on-chip memory that temporarily stores data or instructions operated on by processor 902.

Input/output interface 908 is software or hardware the provides the digital signature to other components for further processing.

Crypto 904 may be, for example, hardware, software, or a combination of hardware and software, that performs cryptographic functions. Crypto 904 may comprise, for example, a module 905 for storing math library routines such as ModExp routines and other cryptographic algorithms (e.g. Chinese Remainder Theorem).

Crypto 904 may further comprise, for example, high level hardware 906 and low level hardware 907. Hardware can generally be described at different abstraction levels, from high-level software-like environments to low-level composition of electronic building blocks. Typically, the higher levels are only concerned with functional aspects, while the lower levels take more physical aspects into account.

In some embodiments, low level hardware 907 may comprise an 8-bit multiplier in the form of a chip. The 8-bit multiplier is capable of multiplying inputs to the system. Inputs may, for example, comprise 8-bit words. The 8-bit multiplier may also have a property whereby the multiplier consumes less power when certain computed bits are the same. The 8-bit multiplier may also have corresponding less power leakage when it consumes less power. Based on the power consumption profile and leakage of the multiplier during multiplication, it may be possible to determine where the same bits are located and the respective bits (either 1 or 0).

In some embodiments, low level hardware 907 may comprise a higher bit multiplier at a microcode level. For example, the higher bit multiplier may comprise a 16-bit or a 32-bit multiplier that is built from 8-bit multipliers, with the 16-bit or 32-bit multiplier located at the microcode level.

In some embodiments, high level hardware 906 may comprise a 512-bit multiplier built from 32-bit multipliers located at the microcode level. The 512-bit multiplier can be used to multiply two 512 bit input parameters to output a 1024 bit parameter that is twice the input 512 bit parameter. Alternatively, an inter-weave reduction may be performed in an intermediate module, which produces an output of the same size as the original 512 bit input parameter.

In some embodiments, multiplication operations may be performed using software in module 905, which may comprise a high level math library database. For example, the math library database may include a ModexP routine and a top level cryptographic algorithm, such as RSA. The RSA can be masked at a high level by blinding the inputs and a number computed by multiplying the blinded inputs. At the end of the computation, the computed number can be unmasked by multiplying with an inverse parameter. The inverse parameter in RSA is a function of the secret key and can be computed using the secret key. A similar secret key may also be used in the ModexP routine. However, computing the inverse parameter using a secret key in ModexP may add new features to the system. Hence, computing an inverse mask may be faster at the top level RSA than at the ModexP level.

The top level RSA can also compute the inverse mask using only the public parts of the key. The inverse mask may be computed more quickly using the public key than the secret key, without greater risk of leakage.

In some embodiments, it may be preferable to implement the security countermeasures in the present disclosure at low level hardware 907, which allows greater control and flexibility by the user. This is because when security requirements are moved to the top level (such as module 905 or high level hardware 906), there may be limited flexibility in modifying the RSA routine. For example, a smart card manufacturer may not be able to readily modify the RSA routine, because the RSA routine is written in a software such as JavaCard that is provided by a third party supplier.

Thus, in some embodiments, security countermeasures in the form of a masking method may preferably be implemented at low level hardware 907. At low level hardware 907, the unmasking parameter may not need to depend on the secret key and the modulus. Nevertheless, even if there is a modulus line, the squares of the modulus may still be computed using the squares of the masking parameter with the modulus, without leaking much information about the modulus.

Implementing the security countermeasure at low level hardware 907 (at the microcode level) may also provide other benefits. In some devices, a countermeasure may not be necessary when device 900 is first used. However, after the hardware has been used over time and the hardware is still running on the original microcode, power leakages may arise that can compromise the secret key in SPA and DPA attacks. A countermeasure at the microcode level may address the above problems.

As those skilled in the art will appreciate, the techniques described above are not limited to particular host environments or form factors. Rather, they can be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

Some of the methods performed by the device may be implanted using computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, some of the methods can be implemented in hardware components or combinations of hardware and software such as, for example, ASICs, special purpose computers, or general purpose computers.

All of the foregoing illustrates exemplary embodiments and applications from which related variations, enhancements and modifications will be apparent without departing from the spirit and scope of those particular techniques disclosed herein. Therefore, the invention(s) should not be limited to the foregoing disclosure, but rather construed by the claims appended hereto.

What is claimed is:

1. A computer-implemented method, comprising:
asymmetrically masking an operation in modular exponentiation to increase, resistance to Simple Power Analysis (SPA) attacks using a processor and at least one memory, by:
receiving one or more inputs at the processor, wherein the inputs comprise one or more operands;
defining a mask value and a fix value, wherein the mask value and the fix value are stored in a first location of the at least one memory;
defining a left-hand-side (LHS) parameter and a right-hand side (RHS) parameter to be each equal to the one or more inputs;
calculating a plurality of temporary values using the LHS and RHS parameters and the mask value;
generating an output based on one of the plurality of temporary values and the fix value; and
using the output in a modular exponentiation operation, wherein the modular exponentiation operation is a squaring operation or a multiplication operation, and
if the modular exponentiation operation is a multiplication operation, the fix value is a function of the mask value and one of the inputs, and the fix value is stored in a second location of the at least one memory.

2. The method of claim 1, wherein the fix value is an unmasking parameter.

3. The method of claim 1, wherein the input is received in an unmasked format and the output is generated in an unmasked format.

4. The method of claim 1, wherein the input is received in a masked format and the output is generated in a masked format.

5. The method of claim 1, wherein if the operation is a squaring operation, the temporary values do not contain any term that is a multiplication product of the input and the mask value.

6. The method of claim 1, wherein one of the inputs is constant.

7. The method of claim 1, wherein the modular exponentiation includes a sliding window algorithm.

8. The method of claim 1, wherein the mask value is kept constant throughout the modular exponentiation.

9. The method of claim 1, wherein the mask value is public.

10. The method of claim 1, wherein the mask value is equal to a value of one.

11. The method of claim 1, wherein intermediate values produced in the modular exponentiation are masked.

12. A computer-implemented method, comprising:
asymmetrically masking an operation in modular exponentiation to increase resistance to Simple Power Analysis (SPA) attacks using a processor and at least one memory, by:
receiving one or more inputs at the processor, wherein the inputs comprise one or more operands;
defining a mask value and a fix value, wherein the mask value and the fix value are stored in a first location of the at least one memory;
defining a left-hand-side (LHS) parameter and a right-hand side (RHS) parameter to be each equal to the one or more inputs;
calculating a plurality of temporary values using the LHS and RHS parameters and the mask value;
generating an output based on one of the plurality of temporary values and the fix value;
determining whether two consecutive operations comprise a multiplication operation followed by a square operation;
if the two consecutive operations comprise a multiplication operation followed by a square operation:
inserting a first mask between the multiplication operation and the square operation, and
using the output in a modular exponentiation operation, wherein the modular exponentiation operation comprises a plurality of squaring operations and multiplication operations.

13. The method of claim 12, further comprising:
determining whether two consecutive operations comprise two square operations; and
if the two consecutive operations comprise two square operations: inserting a second mask between the square operations.

14. The method of claim 12, further comprising:
determining whether two consecutive operations comprise a square operation followed by a multiplication operation; and
if the two consecutive operations comprise a square operation followed by a multiplication operation: performing a dummy step between the square operation and the multiplication operation.

15. A computer-implemented method, comprising:
asymmetrically masking an operation in modular exponentiation to increase resistance to Simple Power Analysis (SPA) attacks using processor and at least one memory, by;
receiving one or more inputs at the processor, wherein the inputs comprise one or more operands;
defining a mask value and a fix value, wherein the mask value and the fix value are stored in a first location of the at least one memory;
defining a left-hand-side (LHS) parameter and, a right-hand side (RHS) parameter to be each equal to the one or more inputs;
calculating a plurality of temporary values using the LHS and RHS parameters and the mask value;
performing an update step to switch the mask value to another mask value during the modular exponentiation;
generating an output based on one of the plurality of temporary values and the fix value; and
using the output in a modular exponentiation operation,
wherein the another mask value is an inverse of the mask value or a square of the mask value.

16. A computer-implemented method, comprising:
asymmetrically masking an operation in modular exponentiation to increase resistance to Simple Power Analysis (SPA) attacks using a processor and at least one memory, by:
receiving one or more inputs at the processor, wherein the inputs comprise one or more operands;
defining a mask value and a fix value, wherein the mask value and the fix value are stored in a first location of the at least one memory;
defining a left-hand-side (LHS) parameter and a right-hand side (RHS) parameter to be each equal to the one or more inputs;
calculating a plurality of temporary values using the LHS and RHS parameters and the mask value;
increasing a number of clusters during the modular exponentiation;
generating an output based on one of the plurality of temporary values and the fix value; and
using the output in a modular exponentiation operation,
wherein the number of clusters is increased by switching the LHS parameter with the RHS parameter, and
wherein increasing the number of clusters is accomplished by at least one of multiplication, different circuit paths, switching at least two parameters, and negating at least one parameter.

17. The method of claim 16, wherein the number of clusters is increased by negating either the LHS parameter or the RHS parameter, or both the LHS and RHS parameters.

18. The method of claim 17, wherein if the output is a negative number, the output is further multiplied by another negative number to render a final positive output.

19. The method of claim 16, wherein increasing the number of clusters can reduce the exploitabilty of power leaks.

20. A computer-implemented method, comprising:
asymmetrically masking an operation in modular exponentiation to increase resistance to Simple Power Analysis (SPA) attacks using a processor and at least one memory, by;
receiving one or more inputs at the processor, wherein the inputs comprise one or more operands;
defining a mask value and a fix value, wherein the mask value and the fix value are stored in a first location of the at least one memory;
defining a left-hand-side (LHS) parameter and a right-hand side (RHS) parameter to be each equal to the one or more inputs;
calculating a plurality of temporary values using the LHS and RHS parameters and the mask value;
adding dummy multiplication operations in the modular exponentiation to create a symmetrical square-multiplication sequence;
generating an output based on one of the plurality of temporary values and the fix value; and
using the output in a modular exponentiation operation.

21. The method of claim 20, wherein the dummy multiplication operations comprise:
multiplying the output by a value of one; and/or
multiplying the output by a previous input to obtain a result, and discarding the result; and/or
multiplying the output by a blinding factor to obtain another result, and carrying the another result over to a next operation.

22. A computer-implemented method, comprising:
asymmetrically masking an operation in modular exponentiation to increase resistance to Simple Power Analysis (SPA) attacks using a processor and at least one memory, by:
receiving one or more inputs, wherein the inputs comprise one or more operands;
defining a mask value and a fix value, wherein the mask value and the fix value are stored in a first location of the at least one memory;
defining a left-hand-side (LHS) parameter and a right-hand side (RHS) parameter to be each equal to the one or more inputs;
calculating a plurality of temporary values using the LHS and RHS parameters and the mask value;
applying mid-loop updates to resist against higher order Differential Power Analysis (DPA) attacks;
generating an output based on one of the plurality of temporary values and the fix value; and
using the output in a modular exponentiation operation.

23. The method of claim 22, wherein the mid-loop updates comprise squaring from left to right along an exponent.

24. The method of claim 23, wherein the mid-loop updates further comprise raising a bit in the exponent to the third power from one trace to a next trace to prevent collisions.

25. The method of claim 24, wherein the mid-loop updates are based on a Fibonacci number-like sequence.

* * * * *